United States Patent
Brommer et al.

(10) Patent No.: US 10,085,159 B2
(45) Date of Patent: Sep. 25, 2018

(54) WIRELESS ENVIRONMENT OPTIMIZATION SYSTEM

(71) Applicant: Fat Mongoose Technologies Inc., Nashua, NH (US)

(72) Inventors: Karl D. Brommer, Exeter, NH (US); Brent J. Forman, Amherst, NH (US); Jason A. Novak, Nashua, NH (US)

(73) Assignee: Fat Mongoose Technologies, Inc., Nashua, NH (US)

( * ) Notice: Subject to any disclaimer, the term of this patent is extended or adjusted under 35 U.S.C. 154(b) by 184 days.

(21) Appl. No.: 15/165,647

(22) Filed: May 26, 2016

(65) Prior Publication Data

US 2017/0339576 A1     Nov. 23, 2017

Related U.S. Application Data

(60) Provisional application No. 62/340,122, filed on May 23, 2016.

(51) Int. Cl.
| | |
|---|---|
| *H04W 24/02* | (2009.01) |
| *H04L 12/26* | (2006.01) |
| *H04L 27/00* | (2006.01) |
| *H04L 27/14* | (2006.01) |
| *H04L 27/22* | (2006.01) |

(Continued)

(52) U.S. Cl.
CPC .......... *H04W 24/02* (2013.01); *H04B 1/0003* (2013.01); *H04B 7/04* (2013.01); *H04L 27/0008* (2013.01); *H04L 27/0012* (2013.01); *H04L 27/14* (2013.01); *H04L 27/22* (2013.01); *H04L 43/18* (2013.01); *H04L 67/12* (2013.01); *H04W 4/70* (2018.02); *H04W 24/08* (2013.01); *H04L 5/005* (2013.01); *H04W 40/244* (2013.01); *H04W 84/12* (2013.01)

(58) Field of Classification Search
None
See application file for complete search history.

(56) References Cited

U.S. PATENT DOCUMENTS

| | | |
|---|---|---|
| 5,099,248 A | 3/1992 | Brommer |
| 6,029,053 A | 2/2000 | Brommer |

(Continued)

OTHER PUBLICATIONS

U.S. Appl. No. 15/243,263, filed Aug. 22, 2016—not yet published.

(Continued)

*Primary Examiner* — Ayaz Sheikh
*Assistant Examiner* — Faiyazkhan Ghafoerkhan
(74) *Attorney, Agent, or Firm* — Hayes Soloway PC

(57) ABSTRACT

A system is provided for the optimization of wireless networks and more particularly a system for automatically probing the wireless environment with a large number of waveforms having different characteristics and measuring the wireless environment to ascertain optimal transmission parameters. The probing system utilizes a software defined radio beacon provided with stored parameterized reference waveforms in combination with a software defined diagnostic receiver functioning as a correlating spectrum analyzer for correlating incoming signals with the same parameterized reference waveforms for analysis of the wireless environment to determine optimal transmission parameters for transmitters at various nodes on the network.

15 Claims, 22 Drawing Sheets

(51) Int. Cl.
*H04B 7/04* (2017.01)
*H04L 29/08* (2006.01)
*H04W 24/08* (2009.01)
*H04B 1/00* (2006.01)
*H04W 4/70* (2018.01)
*H04W 84/12* (2009.01)
*H04L 5/00* (2006.01)
*H04W 40/24* (2009.01)

(56) References Cited

U.S. PATENT DOCUMENTS

| | | | |
|---|---|---|---|
| 6,233,443 B1 | 5/2001 | Brommer | |
| 6,826,140 B2 | 11/2004 | Brommer et al. | |
| 7,092,452 B2 | 8/2006 | Taylor et al. | |
| 7,233,620 B2 * | 6/2007 | Brommer | H04B 1/7105 375/219 |
| 7,486,722 B2 | 2/2009 | Brommer et al. | |
| 7,599,346 B2 | 10/2009 | Brommer | |
| 7,777,626 B2 | 8/2010 | Brommer et al. | |
| 7,970,357 B2 | 6/2011 | Gili et al. | |
| 8,010,048 B2 | 8/2011 | Brommer et al. | |
| 8,044,797 B2 | 10/2011 | Brommer et al. | |
| 8,049,622 B2 | 11/2011 | Brommer et al. | |
| 8,089,946 B2 | 1/2012 | Brommer | |
| 8,115,630 B2 | 2/2012 | Brommer et al. | |
| 8,160,497 B2 | 4/2012 | Brommer et al. | |
| 8,185,052 B2 | 5/2012 | Brommer et al. | |
| 8,190,090 B2 | 5/2012 | Brommer et al. | |
| 8,260,201 B2 | 9/2012 | Rossman et al. | |
| 8,295,767 B2 | 10/2012 | Brommer et al. | |
| 8,319,636 B2 | 11/2012 | Brommer et al. | |
| 8,373,543 B2 | 2/2013 | Brommer et al. | |
| 8,675,781 B2 * | 3/2014 | Adnani | H04B 1/006 375/238 |
| 8,744,230 B2 | 6/2014 | Hovagim et al. | |
| 8,792,532 B2 * | 7/2014 | Makh | H04W 48/12 375/132 |
| 9,011,345 B2 | 4/2015 | Brommer et al. | |
| 9,342,989 B2 | 5/2016 | Brommer et al. | |
| 9,370,019 B2 * | 6/2016 | Makh | H04W 48/12 |
| 9,832,670 B1 * | 11/2017 | Brommer | H04B 1/0003 |
| 2003/0104848 A1 * | 6/2003 | Brideglall | G06K 7/0008 455/574 |
| 2004/0022206 A1 * | 2/2004 | Blanchard | H04B 7/216 370/320 |
| 2005/0003828 A1 * | 1/2005 | Sugar | H04W 24/00 455/456.1 |
| 2006/0205396 A1 * | 9/2006 | Laroia | H04L 1/0015 455/422.1 |
| 2006/0285585 A1 * | 12/2006 | Sampath | H04B 7/063 375/227 |
| 2007/0243839 A1 * | 10/2007 | Kostic | H04B 7/0413 455/132 |
| 2011/0093540 A1 | 4/2011 | Eisenberg et al. | |
| 2013/0028293 A1 * | 1/2013 | Makh | H04W 48/12 375/132 |
| 2013/0064328 A1 * | 3/2013 | Adnani | H04B 1/006 375/340 |
| 2014/0247140 A1 * | 9/2014 | Proud | H04W 4/70 340/870.02 |
| 2014/0269540 A1 * | 9/2014 | Wang | H04W 72/1215 370/329 |
| 2014/0362789 A1 * | 12/2014 | Makh | H04W 48/12 370/329 |
| 2015/0200557 A1 | 7/2015 | Brommer et al. | |
| 2016/0119804 A1 * | 4/2016 | He | H04W 24/08 370/252 |
| 2017/0180168 A1 * | 6/2017 | Terry | H04L 27/001 |
| 2017/0339577 A1 * | 11/2017 | Brommer | H04B 1/0003 |
| 2017/0339578 A1 * | 11/2017 | Brommer | H04B 1/0003 |

OTHER PUBLICATIONS

U.S. Appl. No. 15/264,134, filed Sep. 13, 2016—not yet published.

* cited by examiner

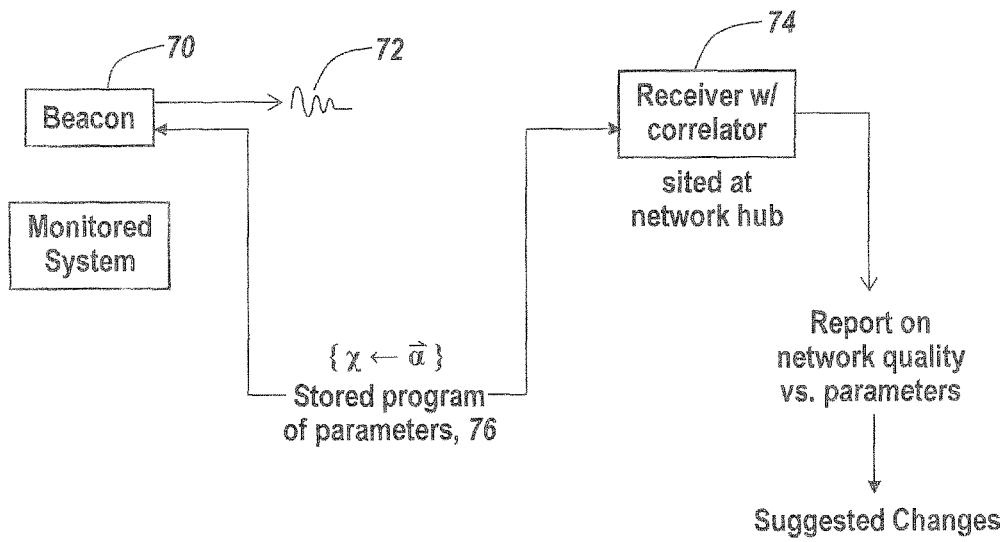

{{modulation types},{frequencies},{amplitudes},{codes},{antennas},{other parameters}}

Braces {} indicate a set of parameters stored in memory

Call each parameterized waveform a vector P, short for X{a}
Call B the background when P is not transmitted
For each transmitted P calculate
P*B - how P degrades background
P*Ra - how P correlates with reference vector - must be greater than minimum detection threshold plus margin

*Fig. 4*

Bluetooth, WiFi, LTE, 60 GHz protocol, WiGig, Z wave and Zigbee (low data rate),
IEEE 802.11; AES; WEP; WPA; WPAZ (for security), Orthogonal Frequency,
Division Multiplexing, OFDM, MIMO (multiple input/ multiple output), Channel Bonding CB,
INTEL Centrino Advanced N plus WiMax, Dual Band
INTEL Centrino Wireless N plus WiMax, ANT

Annotated Spectra
Strong Signal of Interest
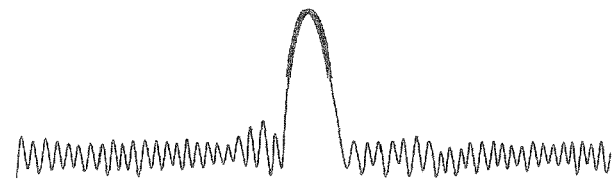
Signal of Interest Next to Strong Signal
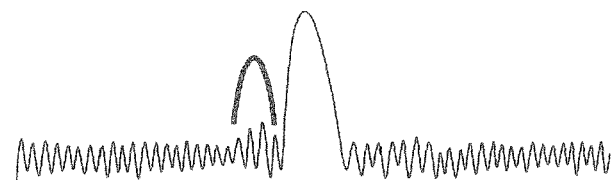
Weak Signal of Interest
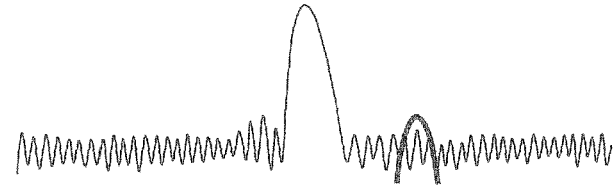
*Fig. 15*

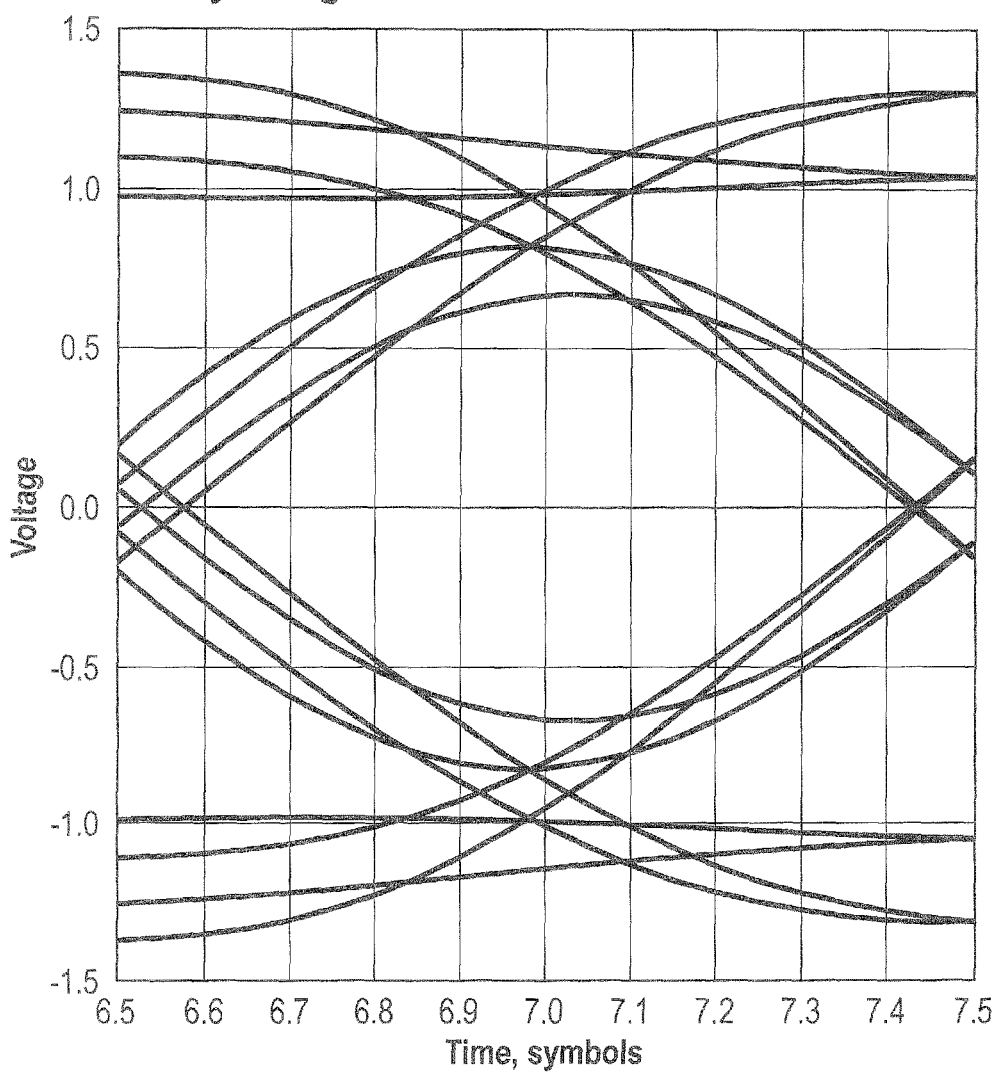
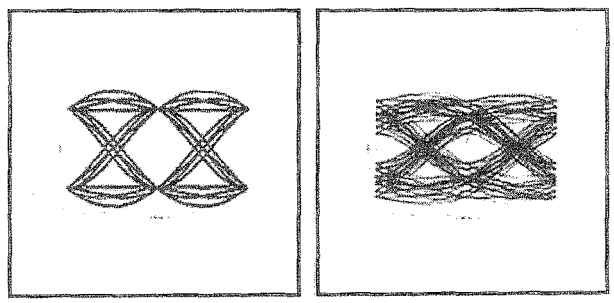
Fig. 16

WIRELESS ENVIRONMENT OPTIMIZATION SYSTEM

CROSS REFERENCE TO RELATED APPLICATION

This application claims benefit of U.S. Provisional Application Ser. No. 62/340,122 filed May 23, 2016, entitled, "Wireless Environment Optimization System" the entire disclosure of which is incorporated herein by reference.

This invention relates to the optimization of wireless networks and more particularly to a system for automatically probing the wireless environment with a large number of waveforms having different characteristics and measuring the wireless environment to ascertain optimal transmission parameters.

BACKGROUND OF THE INVENTION

Wireless communication is becoming ubiquitous, especially with the advent of the Internet of Things in which numbers of wireless devices are interconnected. While the interconnection of various wireless devices that rely on such protocols as Bluetooth, Wi-Fi, Wi-Gig, Z wave, Zigbee and others provide interconnectivity without human intervention, the robustness of these wireless links is in question. Link reliability depends for instance on output power, modulation type, antenna configuration, the number of channels utilized and the coding system employed.

Application for wireless devices include medical applications, healthcare applications, household device applications, fitness and training applications, inventory control applications, remote device monitoring applications, beacons and security systems. Mostly the above protocols are utilizing point-to-point communications, many to many communications and many to one communications.

In wireless communication systems, channel dropouts and interfering signals from nearby interferers, multipath, noisy equipment, lack of signal strength, channel fading, blocking structures and other artifacts interrupt the links between the wireless nodes and thus make the wireless network less robust. The net result is that device-to-device communication can be intermittent and can result in system failures.

Nowhere is this more important than in HVAC applications in which for instance a thermostat may be deprived of temperature data which in turn can cause a furnace not to turn on. This can be catastrophic and can lead in some instances to burst pipes, to say nothing of losing HVAC optimization. Moreover if the thermostat were somehow to be set constantly on and calling for heat, the amount of fuel used during this thermostat malfunction cannot be recalled, resulting in non-recoverable fuel costs.

These types of problems are especially prevalent in the home environment in which appliances such as washing machines, stoves, refrigerators, and other wireless devices may be controlled over the Internet through wireless communication between a wireless hub and the particular devices involved. It is not infrequent that household activities are linked to so-called smart phones that are provided with applications designed to control household gadgets. Not only are the above the appliances subject to failure due to failure of the wireless network, even lighting and alarm systems which can be wirelessly interconnected are prone to failure due to failure of the wireless network. More particularly, these networks are very sensitive to the environment in which they operate.

The degree to which the wireless nodes operate properly depend on a number of factors having to do with the radios themselves, the frequency at which they operate, the protocols utilized, their antenna structures, their location, the number of channels utilized, the number of antennas utilized and in general factors related to RF communications including RF feedback, fading, insufficient power, frequency crowding and a number of conditions which are not in the control of the individual for whom the service is to be provided.

For instance it is well-known that garage door openers can be activated by other sources of RF energy. Lack of Bluetooth connectivity can be due to a lack of power, multipath, and intermittent environmentally caused problems, causing the Bluetooth user to wonder whether or not his or her equipment is operating properly. Thus, wireless earbuds may not operate satisfactorily, wireless speakers may not provide the required audio quality, and various sensors such as for instance fire detection sensors, carbon monoxide sensors, temperature sensors, and for instance pipe leak sensors may not have robust wireless communication.

Many of these problems can be alleviated at the time of setup of the wireless network by the proper positioning of wireless transmitters and a spectrum analyzer, and the adjustment of power and other transmission mode parameters to optimize the wireless system. Note that the above problems are exacerbated where frequency channels are unregulated. This is because frequencies for use in wireless communications are often times allocated for general unlicensed use.

Current wireless network evaluation is accomplished with spectrum analyzers, signal generators, portable power meters and portable transmitters which do not adequately address the problem of signal environment analysis and may, inter alia, be too expensive for portable use at wireless device installations. More often they also lack functionality to locate and evaluate weak transmitters in noisy environments. Moreover, technicians must be specially trained in the operation of this complex equipment. Even spectrum analysis on sophisticated lab equipment is unlikely to reveal weak transmitters in interference. There is therefore a need for a system to adequately characterize the RF environment and to be able to suggest optimization procedures.

SUMMARY OF THE INVENTION

In the subject invention the RF environment is optimized by providing portable software defined radios, one of which is a sounding beacon that automatically and sequentially generates waveforms simulating different wireless protocols to permit evaluation of the environment. The second software defined radio is a wideband diagnostic correlating receiver for receiving the beacon transmission and is used to evaluate the RF environment to determine the optimal transmission mode for each node.

The beacon is provided with stored parameterized reference waveforms in combination with a software defined diagnostic receiver functioning as a correlating spectrum analyzer for correlating incoming signals with the same parameterized reference waveforms to determine optimal transmission parameters for transmitters at various nodes of the network.

For the present purposes the optimal transmission mode for a given link is one wherein there is robust point-to-point communication for a link that does not interfere with other signals in the environment. How this is arrived at is as follows:

In one embodiment the correlated output of the receiver for each simulated wireless protocol is an estimated waveform quality measure of Xa*Ra which is a measure of the correlation of the reference signal Ra and the received signal Xa with the background subtracted, generally measuring signal-to-noise ratio. There is one additional measure of waveform quality, the dot products of signal and background. Xa*B represents the amount of signal that affects the background, bearing in mind that the Xa is an estimate of the reference waveform. In other words, this additional measure is a measure of the overlap between the signal and the background. Ideally one wants zero overlap or orthogonality. To the degree that there is overlap is the degree to which signals interfere and their parameters should be selected to minimize this interference.

Therefore the estimated waveform quality is a combination of 1) the degree of correlation between the received signal and reference signal and 2) the orthogonality between signal and background. Using these metrics, one can measure each simulated transmission and adjust parameters and siting for each beacon to maximize the estimated waveform quality. Once this is accomplished, parameters chosen will provide the most robust link connection between two points that does not interfere or degrade other signals in the environment. After evaluation, software defined radios at each transmitting node can be reconfigured with optimal parameters. This can include adjustment of output power levels, transmission timing, the use of specialized waveforms, special duty cycles, specialized antenna configurations, frequency adjustments, and other techniques to give a maximum probability of closure for each link in the system.

More particularly, an RF environment analyzing tool is provided that includes a software defined beacon that automatically and sequentially transmits a complete set of parameterized reference waveforms and a software defined wideband radio that functions as a correlating spectrum analyzer for correlating incoming signals with the set of beacon generated parameterized reference waveforms. This specialized spectrum analyzer is particularly well adapted to detect signals below the noise level of conventional spectrum analyzers because it can pick out low amplitude signals due to correlation with the preprogrammed beacon waveforms. As a result, the subject system is uniquely well adapted to analyze wireless tags or sensors involving weak tag or sensor signals. This system can thus accommodate range limited remote sensors as well as the entire field of RFID tags.

Instead of a laboratory or portable spectrum analyzer and a signal generator, in the subject system two portable software-defined devices are used. The first is a transmitter that can model a wide range of wireless nodes by changing waveforms, antennas, and protocols. The second is a wideband receiver that includes a correlating spectrum analyzer that functions as a scalar signal analyzer, a vector signal analyzer, a pulse detector and an interference analyzer.

It is a feature of the subject invention that beacon sounding sequences vary transmitter parameters during an RF environment testing cycle so as to simulate a large number of wireless protocols. Signals from the beacon are detected at the receiver to determine optimal settings for wireless devices within the RF environment, with this determination taking into account other potentially interfering wireless transmitters. It will be appreciated that by successively replacing each wireless device at a node with a software defined portable beacon, a technician by measuring the wireless environment can sequentially improve the wireless network by adjusting the operating parameters of radios on the network. Additionally, by replacing wireless devices at nodes within the wireless network with inexpensive software defined portable beacons, one can find even more optimal configurations.

The current approach is to have a portable receiver look at the local environment, have a technician install a beacon at a test node and adjust wireless device power, antenna configuration, data rate and waveforms based on the results of the wireless environment testing.

It can be shown that by using parameterized reference waveform sequences, optimization algorithms, and techniques for sequentially testing nodes one can simulate common protocols, with these techniques taking into account low duty cycle nodes and critical service nodes so as to permit sampling multiple nodes for simultaneous optimization.

What the subject system establishes are the power levels, optimal coding sequences, directional antenna characteristics and other parameters that permit point-to-point communication without the transmitting entity interfering with other entities in the wireless environment, while at the same time providing robust point-to-point communications at power levels, frequency allocations and modulation formats which do not have one transmitter in the environment interfering with other transmitting nodes.

It is desirable that signal and background be orthogonal or that the dot products equal zero. To the extent that these dot products are nonzero they represent the interference of signal with background and background with signal. The dot products therefore provide a measure of the quality of the link between a transmitter and receiver. What one is trying to do is to find a set of parameters such that the background does not degrade the signal and the signal does not degrade the background.

Absent this orthogonality, the subject system allows one to choose a transmitted waveform p that has a benign effect on the background, b, and also one that is robust enough to maintain a point-to-point link. It also tells if one has reasonable propagation with respect to the siting and antenna for the chosen p. If one has chosen a modulation type that is dispersive in frequency such as a broadband signal, it is desirable to choose the signal which has the narrowest banded modulation. On the other hand if bad multipath conditions exist one wishes to choose a wide bandwidth which allows one to resolve multipath environments.

For instance multipath depends on the modulation type chosen for P where B is background and P is signal. The system records the environment when the test signal is not on the air and sorts out what signals are in the environment, what is noise and then for each waveform calculates the P dot B. To a first approximation the best signal that P can transmit is the one that has the smallest P dot B. What one is trying to do is to find a set of parameters such that the background does not degrade the signal and the signal does not degrade the background.

Another feature of the subject invention is that the correlating receiver in one embodiment uses advanced signal detection including interference cancellation, frequency drift compensation, cross ambiguity function processing and rake techniques. Moreover, with such a diagnostic receiver one can site two or more receivers to spatially locate interference and develop antenna siting strategies.

In summary, what is provided is a system for the optimization of wireless networks and more particularly a system for automatically probing the wireless environment with a large number of waveforms having different characteristics and measuring the wireless environment to ascertain optimal transmission parameters. The probing system utilizes a software defined radio beacon provided with stored parameterized reference waveforms in combination with a software defined diagnostic receiver functioning as a correlating spectrum analyzer for correlating incoming signals with the same parameterized reference waveforms for analysis of the wireless environment to determine optimal transmission parameters for transmitters at various nodes on the network.

BRIEF DESCRIPTION OF THE DRAWINGS

These and other features of the Subject Invention will be better understood in connection with the Detailed Description in conjunction with the Drawings, of which:

FIG. 4 is a block diagram of a system for characterizing a wireless environment by utilizing a beacon for transmitting a wide variety of signals, modulation types, power levels and other parameters of a wireless device so as to emulate a number of different wireless devices and a receiver for receiving the beacon signals, with the beacon being provided with a stored program of parameters such that its output may be cycled to approximate the output of a large number of different types of wireless devices, with the receiver being provided with a correlator to receive the beacon signals, the correlator being driven by the same stored program of parameters as that provided to the beacon to permit analysis of network quality versus parameters and provide suggested changes in the wireless devices that will improve communication reliability and minimize interference;

FIG. 15 is a series of waveform diagrams indicating the possibility of detecting a strong signal of interest overlapping a strong signal, a modest signal of interest adjacent a strong signal and a weak signal of interest buried in the noise, all of which being detectable by the subject correlating receiver;

FIG. 16 is an example of an eye pattern or eye diagram that is the output of the subject receiver for the evaluation of the combined effects of channel noise and intersymbol interference on the performance of a baseband pulse transmission system in which a digital signal from the receiver is repetitively sampled and applied to the vertical input of an oscilloscope, while the data rate is used to trigger the horizontal sweep, in which time, symbols are graphed against voltage and indicating there beneath an eye diagram of an uncorrupted binary PSK system as compared to the same system with multipath interference, such that by viewing of the eye diagram the quality of the signal can be ascertained;

DETAILED DESCRIPTION

Figure 1A:
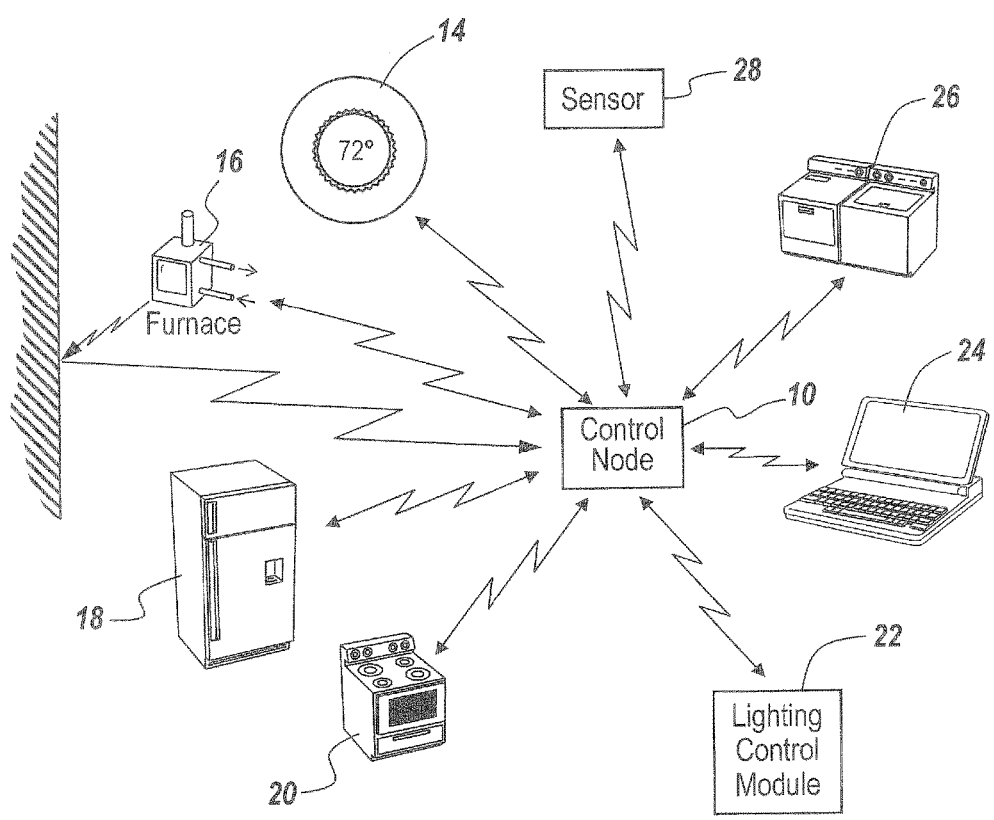
FIG. 1A is a diagrammatic illustration of a number of wireless devices intercommunicating and communicating with a control node in a wireless environment in which robust communications is to be established between wireless devices that exist as nodes on a network.

Referring to FIG. 1A, a multiplicity of wireless communication devices, in this case found in a home, intercommunicate through a control node 10 within a wireless environment 12. As illustrated, wireless communication devices may include for instance a thermostat 14, furnace control 16, refrigerator control 18, stove control 20, a lighting control module 22, a computer 24, a washer dryer combination 26 or in general any sensor 28 utilized to sense a physical parameter within the wireless environment.

All the wireless devices pictured in FIG. 1A are devices which could be characterized as belonging to the wireless Internet of things, each of which have communication protocols peculiar to their particular device. The problem in establishing a robust wireless communication network within an environment is to assure that the communication links between devices or between devices and a control node are robust but yet do not interfere with the communication links to the other devices.

Oftentimes when setting up a wireless environment communication links are not robust due to lack of signal strength, multipath distortion, and interference of one wireless device with another wireless device within the environment. It is difficult for technician setting up wireless communications to be able to configure the devices so as to establish robust communication links and to do so in face of the other interfering radio sources that exist in the environment. Even when the environment is fixed at one particular point in time with a number of known wireless devices, the adding of another wireless device in the environment can cause a dramatic shift in the reliability at all nodes. In addition to interference from close-in wireless devices, external radio frequency sources that flood the wireless environment also have an effect on the ability of the devices within the environment to intercommunicate.

For instance, when a new wireless thermostat is installed, it is important that communications to and from the thermostat be robust so that if the thermostat is used to control a furnace, its operation must be foolproof. Often times in order to increase the performance of the wireless thermostat increasing its output power is used to establish a robust communications. However increasing signal strength may not solve the problem of interference from another wireless source on the same frequency and perhaps using the same modulation format. Moreover an untoward result may be that increasing the power of the thermostat's transmitter may interfere with other wireless devices within the environment.

It is therefore a requirement to be able to measure the effect of one wireless device in the wireless environment on the other devices so that each of the devices may be configured or moved to provide both robust communication links and to minimize interference with each other.

The problem described above gets more difficult when more wireless sensors and communications devices occupy the wireless environment. While in the past perhaps only one or two wireless devices were used within a household, with the development of the Internet of things, many more devices rely on wireless communications. Moreover, not only must the wireless devices communicate within their particular systems, many of these devices are connected to the cloud such that proper operation of all these devices requires careful planning of the wireless space.

Figure 1B:
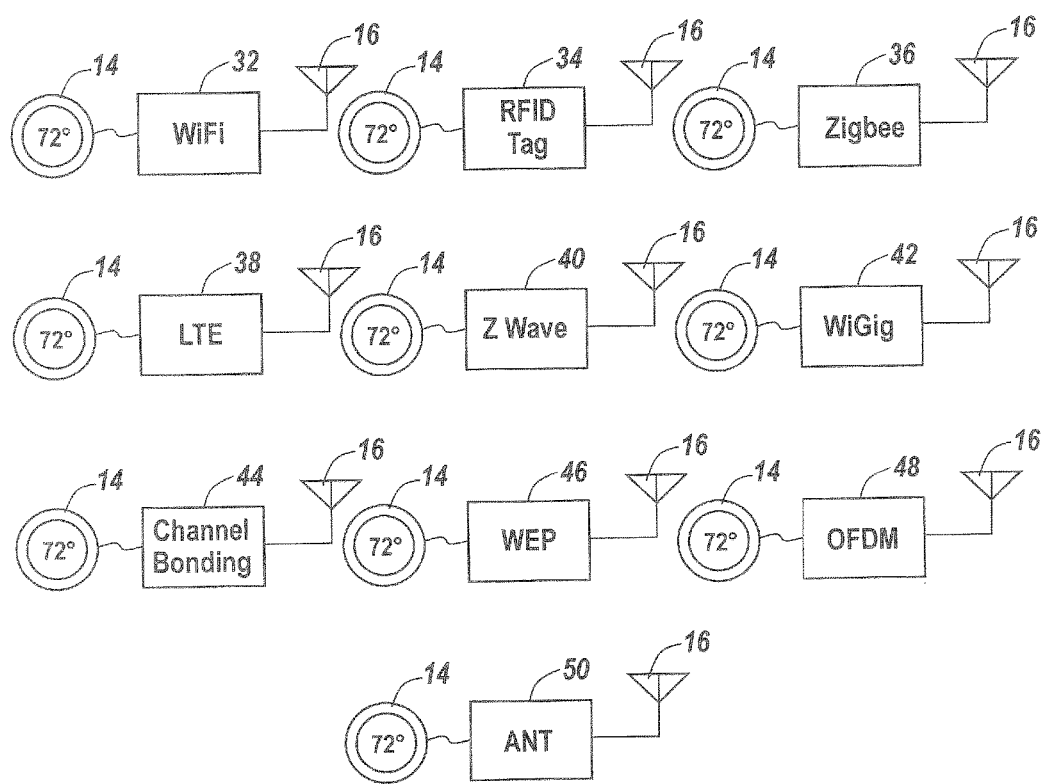
FIG. 1B is a diagrammatic illustration of a number of different wireless devices, each communicating with its own protocol, with the devices each having its own signal characteristics.

To date cumbersome spectrum analyzers are utilized to analyze the wireless environment which are both costly and not configurable to test for all the modulation types and systems that may exist. For instance, and referring now to FIG. 1B there are presently a number of wireless communication modes and techniques which may for instance be utilized to provide communications for thermostat 14. It will be appreciated in this figure that the thermostat serves as a sensor to sense temperature and that this temperature is to be transmitted over a wireless link utilizing antenna 16 to processing nodes. Some of these sensors may be powered by household current, whereas other sensors may be battery-powered or even derive power from ambient energy within the environment. This means that the sensors and associated wireless communication devices are designed to operate at radically different power output levels given a particular application.

For instance thermostat 14 may utilize a Wi-Fi transmission mode 32 which typically has a range of 100 feet depending on the frequency utilized and the output power of the Wi-Fi module. However as illustrated at 34 an RFID tag system may either be battery-powered or rely on obtaining energy from the environment which limits output power significantly. How to separate out the transmissions from Wi-Fi devices and the RFID tags requires power control, frequency control, modulation type control and even the utilization of directional antennas in order to prevent the Wi-Fi signal from swamping the RFID tag signals.

The technician charged with the responsibility of providing a robust wireless environment may be faced for instance with many types of communication systems such as Zigbee 36. LTE 38, Z wave 40, WiGig 42, channel bonding 44, WEP 46, OFDM 48 or ANT 50. In fact when first encountering a wireless environment the technician may be totally unaware of the various communication systems that are operative in the area and without knowledge of the existence of these systems cannot even begin to attempt to optimize the wireless environment.

Figure 2:
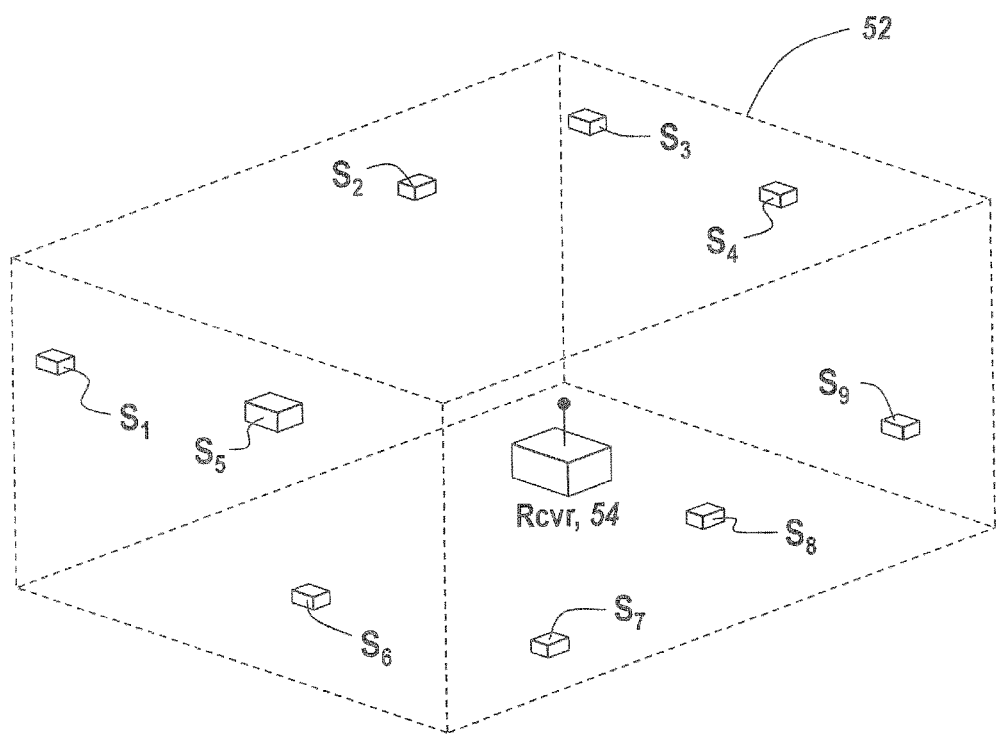
FIG. 2 is a diagrammatic illustration of a wireless environment which is to be optimized, in which a number of radio beacons, each associated with a different wireless device, communicate with a receiver within the space, in which the wireless environment is monitored by the signals between each of the beacons and the communications receiver, with signal analysis establishing the robustness of the links of the network and possible interference between the sources, the analysis permitting reconfiguring of the sources to optimize the wireless environment.

Referring to FIG. 2, what is shown is a wireless environment volume 52 in which there are at least nine signal sources S1-S9 which are placed at various locations within volume 52. The existence of these nine signal sources can be detected by a receiver 54 within volume 52 for purposes of first cataloging the types of signal sources that exist within the volume. It will be appreciated that each of the signal sources may interfere with other signal sources within the volume and unless their properties or parameters are carefully controlled, robust communication links cannot be achieved within the volume.

Figure 3:
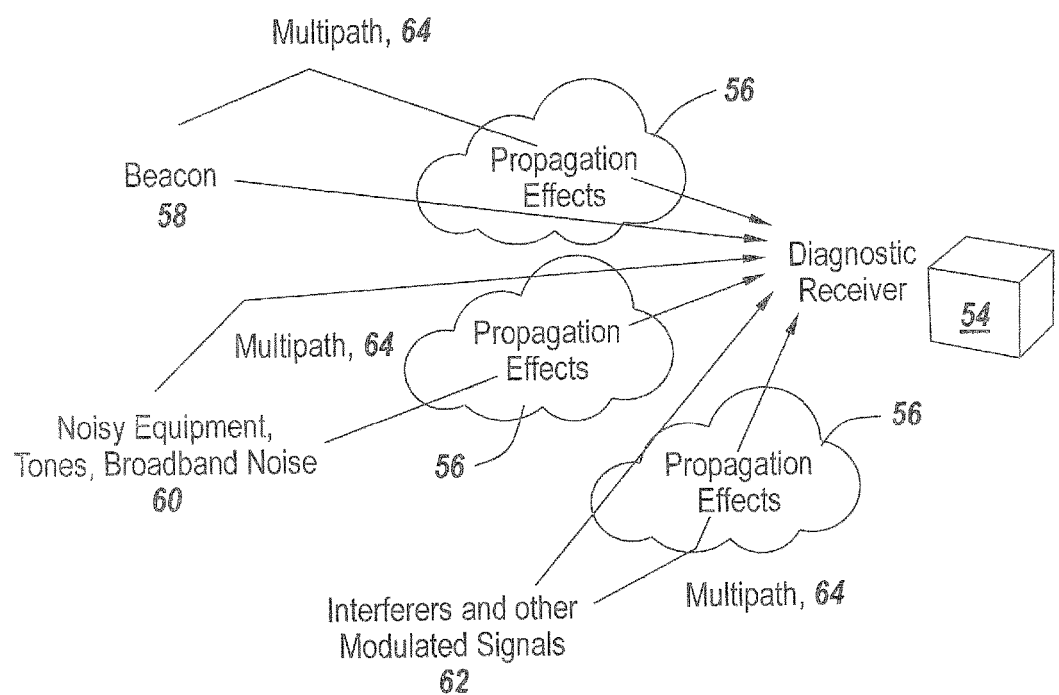
FIG. 3 is a diagrammatic illustration of signal paths through the wireless environment of FIG. 2, with the signal paths altered by propagation effects between a diagnostic receiver and various signal sources such as a beacon, noisy equipment, toned, broadband noise, interferers and other modulated signals indicating the problems of multipath and direct interference.

Referring to FIG. 3, if one had a diagnostic receiver 54 at one position within the environment it might be desirable to measure the propagation effects for instance of a beacon 58 or noisy equipment, tones and broadband noise 60 or interferers and other modulated system signals 62. Each of the signal sources suffers from multipath distortions 64, such that attempting to measure the wireless environment is in fact complicated with a large number of variables that determines the robustness of a communications link as well as the interference probabilities for the signal sources within the environment.

The problem therefore becomes how one can characterize the environment given the existence of a number of different types of signal sources within the environment, the output powers and frequencies of these signal sources, the modulation types employed by the signal sources, the effect of physical location of the sources within the wireless environment and other signal source parameters. If one could properly characterize the wireless environment one could attempt to optimize the wireless devices so as to provide each device with appropriately robust communication links while at the same time minimizing the effect of one source with respect to another source.

Referring to FIG. 4, in the subject invention a beacon 70 is provided within the wireless environment which is sequentially driven so as to simulate each and every one of the potential signal sources in the environment, with the transmitted signal 72 analyzed by a receiver 74 within the wireless environment in which the receiver is provided with a correlator. The beacon is provided with stored program of parameters such that the output of the beacon simulates not only a number of different signal sources but also varies parameters of the signal sources in a systematic fashion. At the same time, the stored program parameters are utilized by the correlator of receiver 74 to be able to detect even the most minute signals from beacon 72 due to the correlation of the received signals with the stored parameter correlator values. Receiver 74 provides a report on network quality versus parameters for each of the signals produced by the beacon and provides suggested changes for the wireless device simulated by beacon 70, with these changes maximizing communication link quality while at the same time minimizing the effect of the wireless transmitter on other transmitters within the wireless environment.

The stored program of parameters, here illustrated at 76, includes sets of modulation types, frequencies, amplitudes, codes, antennas and other parameters. When the beacon is made to simulate all the possible signal sources by transmitting a parameterized waveform as a vector P, the system determines how the background B affects P and how P affects the background B. Ideally B and P are perpendicular or orthogonal vectors.

More particularly, FIG. 4 explains the principle of the subject invention involving the idea that one has a portable signal generator and has a collaborative correlator in the form of a digital receiver. Thanks to a stored set of program parameters the signal generator runs through the parameters in a predetermined order. Knowing this order, the correlator is able to build up measures of the effectiveness for each parameter set coming from the beacon and as a result the system can determine the optimal siting and waveform for the wireless sensor simulated by the beacon. The brackets utilized in this figure indicate mathematical sets, noting that there is a boldface bracket and there is an x symbol which represents a vector of sets. On the other side is an alpha, with the alpha representing another vector of sets. The idea is that the system selects from alpha a set of one element per set for x that constitutes the parameterization for a test waveform. The reason that sets are important is because in a computer one can list all the sets and can run through all the combinations of elements in each set.

For example if one has six parameters and has N waveforms one could try them in order to find the optimal waveform for siting the wireless sensor. Basically what is accomplished is running the beacon through all of the parameters in the alpha set. As a result of cycling the beacon through various parameters one obtains measures essentially looking at the signal and subtracting out the background and looking at the background and subtracting out the signal. It is noted however that P minus B is too simplified. In terms of the mathematics of digital and analog signals, P is actually a vector in Hilbert space. An analog signal is a continuous-time function, for example, sine omega T. A digital signal comes from properly sampling the function and yielding an array of samples, known as a discrete vector, but in the mathematics of Hilbert space they are both denoted as vectors. So now if one has a signal environment, each signal in that environment sums up as a vector into vector B. Now one wants to add a new vector, a candidate vector P. What one wants to do is to choose P so that P dot B equals zero.

In other words if one has N samples and one has an N dimensional vector in space, in principle one can cram each of the N signals into the perpendicular part of the space. So in terms of what the computer does is to sample these analog signals and make them into vectors. It then calculates dot products. It records the environment when the test signal is not on the air. Then computer sorts out what signals are in that environment, what is noise. Then for each one of these that the beacon transmits, the computer calculates P dot B. To a first approximation the best signal that can be transmitted is the one that has the smallest P dot B. In other words, the transmitted signal is orthogonal to the background.

What the system is doing is trying to find a set of parameters such that the background doesn't degrade the signal and the signal does not degrade the background.

For example suppose one had a time slotted system. If one finds an empty time slot then when the calculation P dot B yields zero. The two vectors are perpendicular because there is no region where P overlaps the background. Another example is frequency. Anytime a signal utilizes a completely different set of frequencies than another set of signals, P dot B would be zero. In this way the subject receiver can automatically find timeslots or can automatically find empty frequencies. Moreover, in real-life situations when one is employing coding, or spread spectrum signals, the signals usually overlap but a small overlap is preferred. In this case P dot B can be a measure of where is the best place to put the signal which has the least time overlap or the least frequency overlap.

Note P dot Ra is the correlation of the sampled waveform with the reference and P dot B is the correlation of the sampled waveform with the background. These two quantities measure the orthogonality of the signals which is the ideal. For instance listen to commercial radio stations with one station per channel. Mathematically this means that all of the analog FM signals are orthogonal. When you correlate one against the other one is going to get zero.

Figure 5:
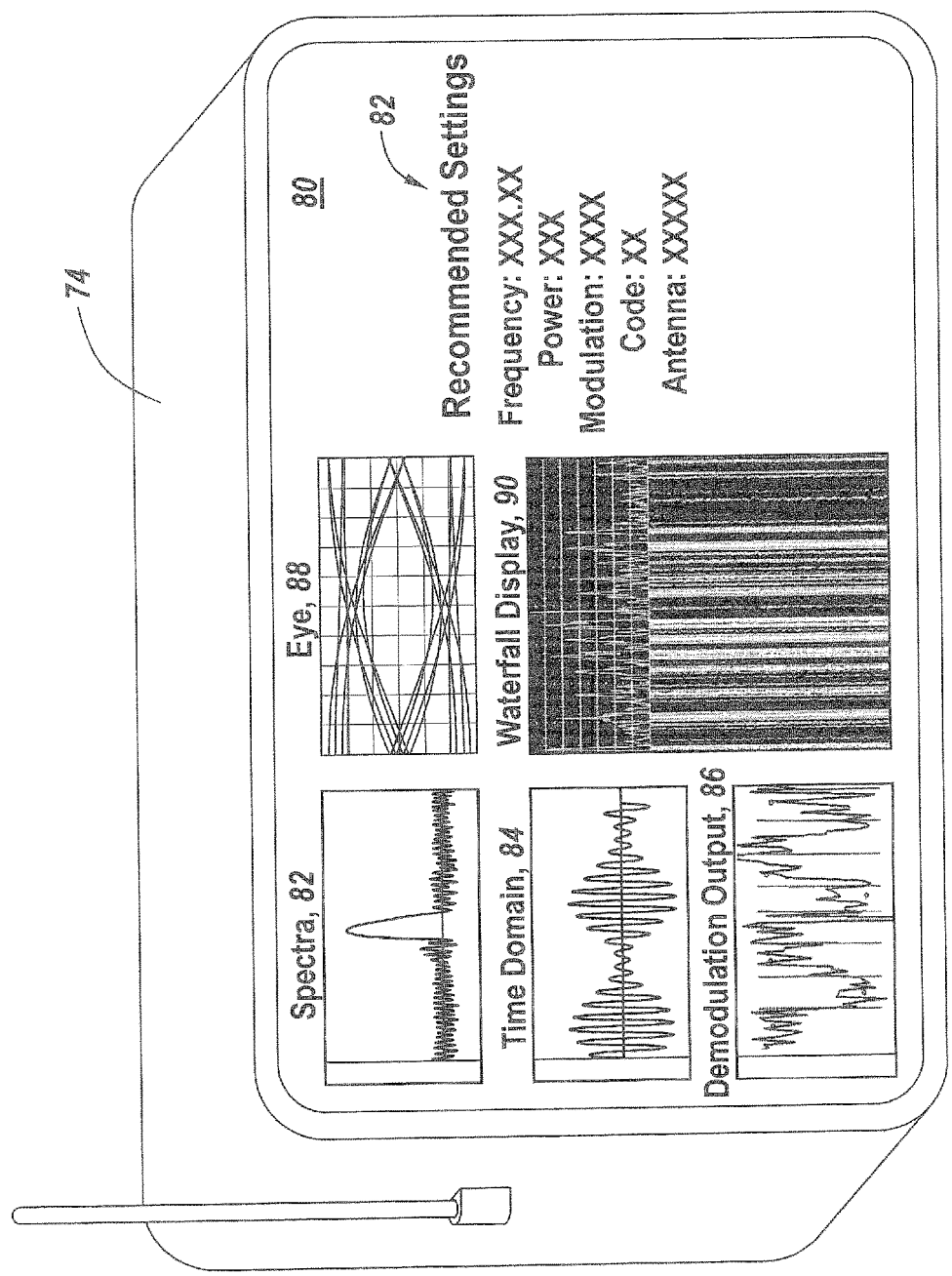
FIG. 5 is a diagrammatic illustration of the output of the receiver of FIG. 4, illustrating, after analysis, recommended settings such as frequency, power, modulation type, code and antenna, as well as displaying spectra, time domain outputs, demodulated signals, Eye diagrams and waterfall displays for the signals detected by the receiver.

The output of the receiver provides a measure of orthogonality of the sets of signals and also the least degraded signal. The output of receiver thus indicates that a P chosen with particular parameters will have a benign effect on the background. It also measures the quality of propagation with respect to the siting and the antenna used for P. Because multipath depends on the modulation type chosen and assuming the same with propagation frequency dispersion if one is operating with a signal that is dispersive in frequency, the communication link would be distorted if one had a wideband signal. Therefore one wants to have a narrow band modulation because the result will be less dispersive. If a channel exhibits bad multipath one wants a wideband channel since the bandwidth allows one to resolve multipath environments Referring now to FIG. 5, receiver 74 is shown with a display 80 that includes recommended settings 82 including frequency, power, modulation type, code and antenna type based on the correlated signals. Also shown are various incoming signal displays, here spectra 82 a time domain representation 84, a demodulated output 86, an eye pattern 88 and a waterfall display 90. Note, with various displays one is able to visualize the incoming signals, whereas the recommended settings are derived from the results of the correlations to be described hereinafter.

Figure 6:
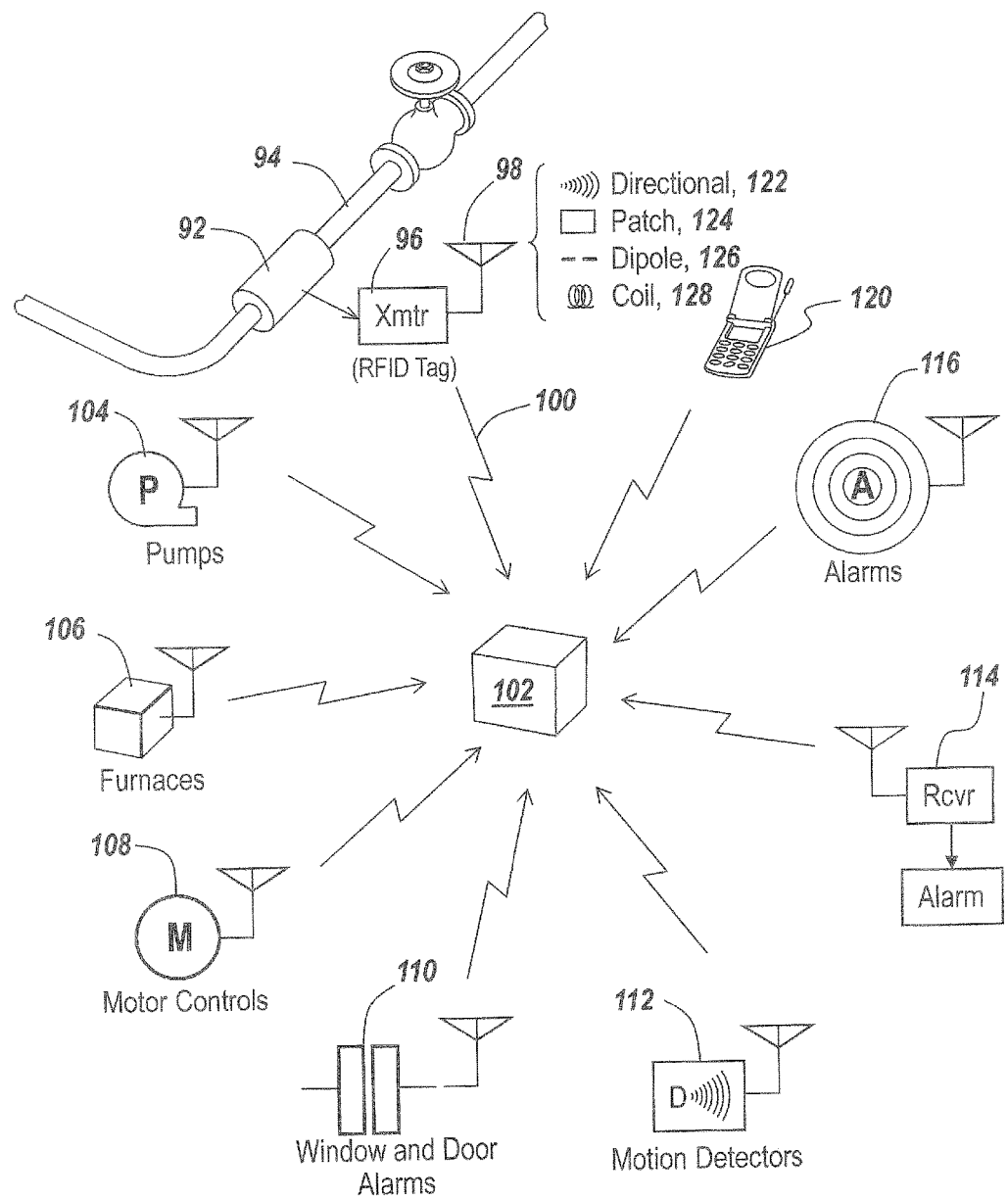
FIG. 6 is a diagrammatic illustration of a plumbing application in which an RFID tag transmitter is utilized as a sensor to sense for instance fluid flow or fluid temperature at a particular node in a plumbing installation, in which the output of the RFID tag competes with wireless outputs of sensors on pumps, furnaces, motor controllers, window and door sensors, motion detectors, handheld wireless communication devices and alarms, with the subject system analyzing the wireless environment to suggest optimal RFID tag parameters for robust communication between the RFID tag and a central node in the network regardless of potential interfering signals.

Prior to describing in detail the operation of the subject system, and referring now to FIG. 6, one of the major applications for the subject optimization technique is in the area of plumbing. Here a plumbing sensor 92 attached to a pipe or conduit 94 is used to sense a particular plumbing parameter such as for instance flowing water, leakage, temperature or the like. The sensed information, in one embodiment is transmitted utilizing an RFID tag 96 and antenna 98, with the tag being utilized to transmit the sensed parameter as illustrated by arrow 100 to a central node 102 within the wireless environment to be optimized.

It will be appreciated that HVAC and other types of plumbing operations are oftentimes in need of constant monitoring for faults, which can indicate a leaky valve or even some catastrophic breakage which would cause the plumbing system to malfunction. It will be appreciated that sensors can be located along pipes or conduits anywhere within for instance a building to monitor the required parameter. The multiplicity of such sensors can be used in the control of building environments; and robust communications between each of the sensors and a central node is important to the management of the building. Because of the long distances that may be involved between a pipe sensor and a control node is important that all of the sensors operate to provide a secure communications link to the control node regardless of how far away they are from the node.

Failure to take into account system faults can result in frozen pipes, failure to maintain room temperatures, or runaway HVAC operation.

As will be appreciated, throughout a building there are a number of wireless devices on various frequencies utilizing various channels which can interfere with each other to degrade the signals from the pipe sensors. These can include remote control pumps 104, furnaces 106, motor control circuits 108, window and door alarms 110, motion detectors 112, alarm receivers 114, area alarms 116 and handheld transmission devices such as cell phones 120. All of these devices can interfere with the signals from the plumbing sensors and their placement existence must be taken into account when configuring transmitter 96 and antenna 98 to assure robust communication. Moreover antenna 98 may take on a number of different configurations including directional antennas 122, patch antennas 124, dipoles 126 and coils 128, with the selection of the antenna in some cases being the difference between robust and spotty communications.

Figure 7:
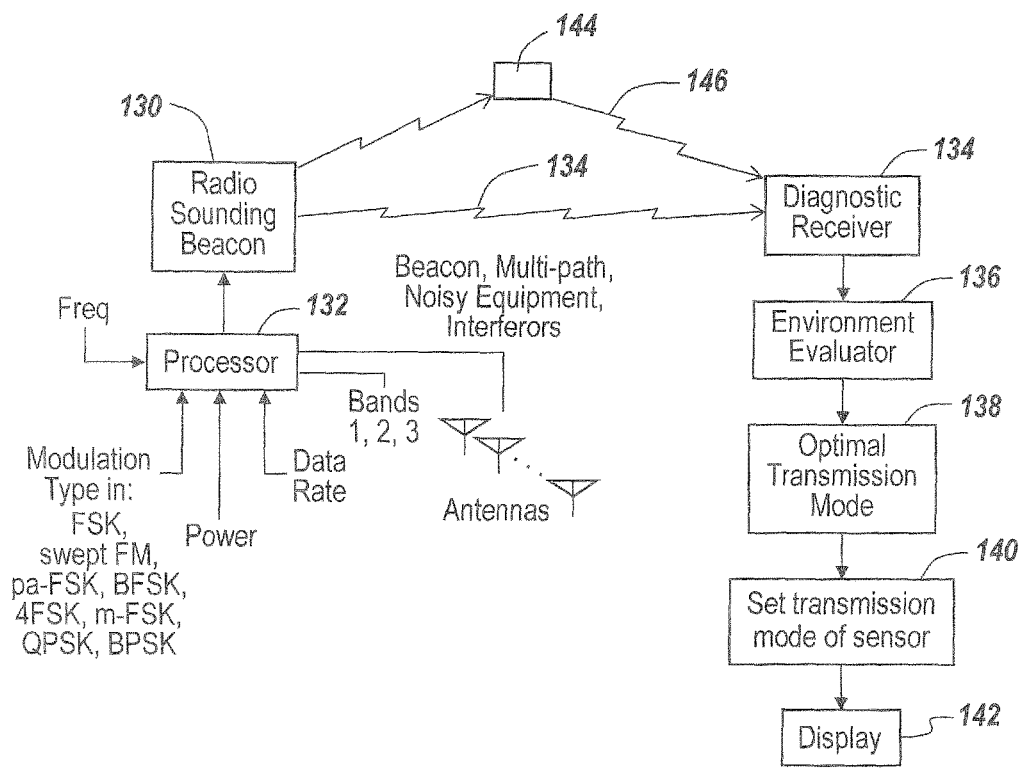
FIG. 7 is a diagrammatic illustration of the wireless environment optimization system of FIG. 4 illustrating a radio sounding beacon under the control of a processor for emulating a large number of wireless devices, in which the processor varies the beacon frequency, modulation type, power, data rate, bands and antennas so as to sequentially simulate the outputs of a number of different wireless devices, such that upon cycling through all of the various possibilities the beacon transmission is analyzed by a diagnostic receiver that evaluates the wireless environment, determines an optimal transmission mode and parameters for the wireless devices in the evaluated environment and offers a set of suggested parameter/waveforms for wireless devices to optimize communication links.

FIG. 7, illustrates the analysis of the wireless environment is analyzed and the optimization network technique. Here a radio sounding beacon 130 is coupled to a processor 132 which alters the output 134 of the beacon 130 to simulate a large number of communication protocols such as those listed at the bottom of the Figure. Processor 132 controls the radio sounding beacon for instance as to frequency, modulation type, power output, data rate, how many and what bands to use, and what antennas or antenna arrays to use.

The output from the radio sounding beacon consists of the beacon signal. Also in the environment are multipath distortions, noisy equipment and the outputs from other interferers since the signals arriving at diagnostic receiver 134 contain all of these components. It is a purpose of the diagnostic receiver to be able to understand which of the various protocols are being in utilized by the radio sounding beacon through a correlation process and to evaluate the environment as illustrated at 136 and to output an optimal transmission mode 138 from which to set the transmission mode of the sensor corresponding to the radio sounding beacon, with the sensor setting illustrated at 140.

Thereafter, the actions to be taken by the technician are displayed by display 142. Not only does the diagnostic receiver 134 receive signals directly from the beacon, multipath signals 146 reflected from objects within the environment also are reflected at 144 which must be taken into account in optimization of the wireless network.

What is now discussed is the sequential cycling of the beacon to approximate the many different types of signal sources and parameters possible so as to be able to accurately analyze the signal space.

Figure 8A:
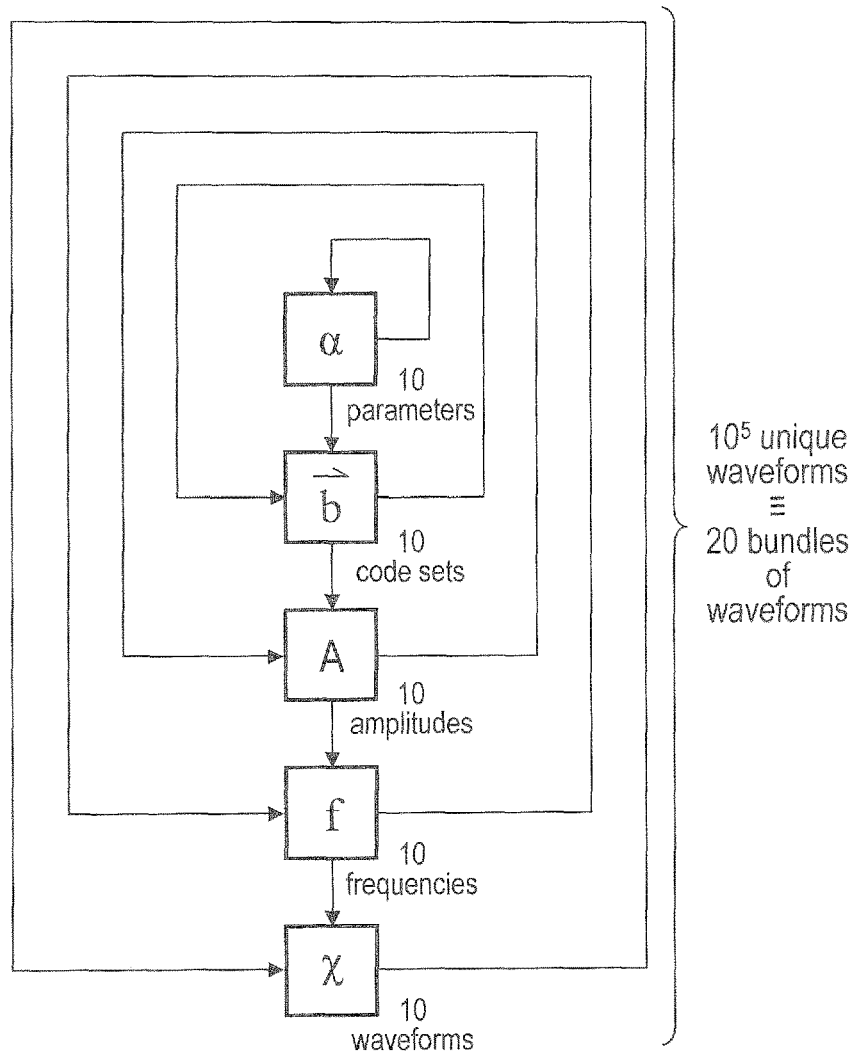
FIG. 8A is a diagrammatic illustration of a methodology to sequentially cycle through a number of parameters, code sets, amplitudes, frequencies for the waveforms of the radio sounding beacon in FIG. 7, with each of the variables in the waveforms generated by the beacon having 10 different possibilities, such that there may be as many as $10^5=100\,000$ unique waveforms generated in 20 bundles of waveforms, such that in one embodiment it takes 20 minutes for a complete cycle to simulate the outputs of a large number of wireless devices to permit wireless environment optimization.

Referring to FIG. 8A, in order to generate a sequential transmission of a number of different modulation types and modes, a nested loop provides for a number of modulation types, frequency sets, amplitudes sets, code sets and parameter sets, all output to control the beacon in a sequential manner. For instance if one starts with parameters for each parameter set, there may be for instance 10 different parameters which should be tried. Having cycled through each of the 10 parameters for a given parameter set, one then accesses the code sets for which they may be 10 different code sets accessed. Thereafter having gone through the parameter sets and the code sets, one takes each of the results and accesses 10 different output signal amplitudes. After having run through all of the above, one then accesses 10 different frequencies and after having exhausted all of the possibilities for all of the above, one then accesses 10 different waveforms associated with modulation types.

As seen from the bottom of FIG. 8A, there are N numbers of possibilities for each of the modulation types, frequencies, amplitudes, code sets and parameter sets, with there being one hundred thousand unique waveforms equivalent to 20 bundles of waveforms. It is estimated with current microprocessor speeds that the entire range of beacon transmission possibilities can be exercised within 20 minutes so that the output of the beacon is made to simulate many different wireless devices with many different parameters. The result is that the signals from the beacon to the receiver simulate the behavior of the communication channel from the beacon to the receiver by simulating as many different possibilities as practicable.

Figure 8B:
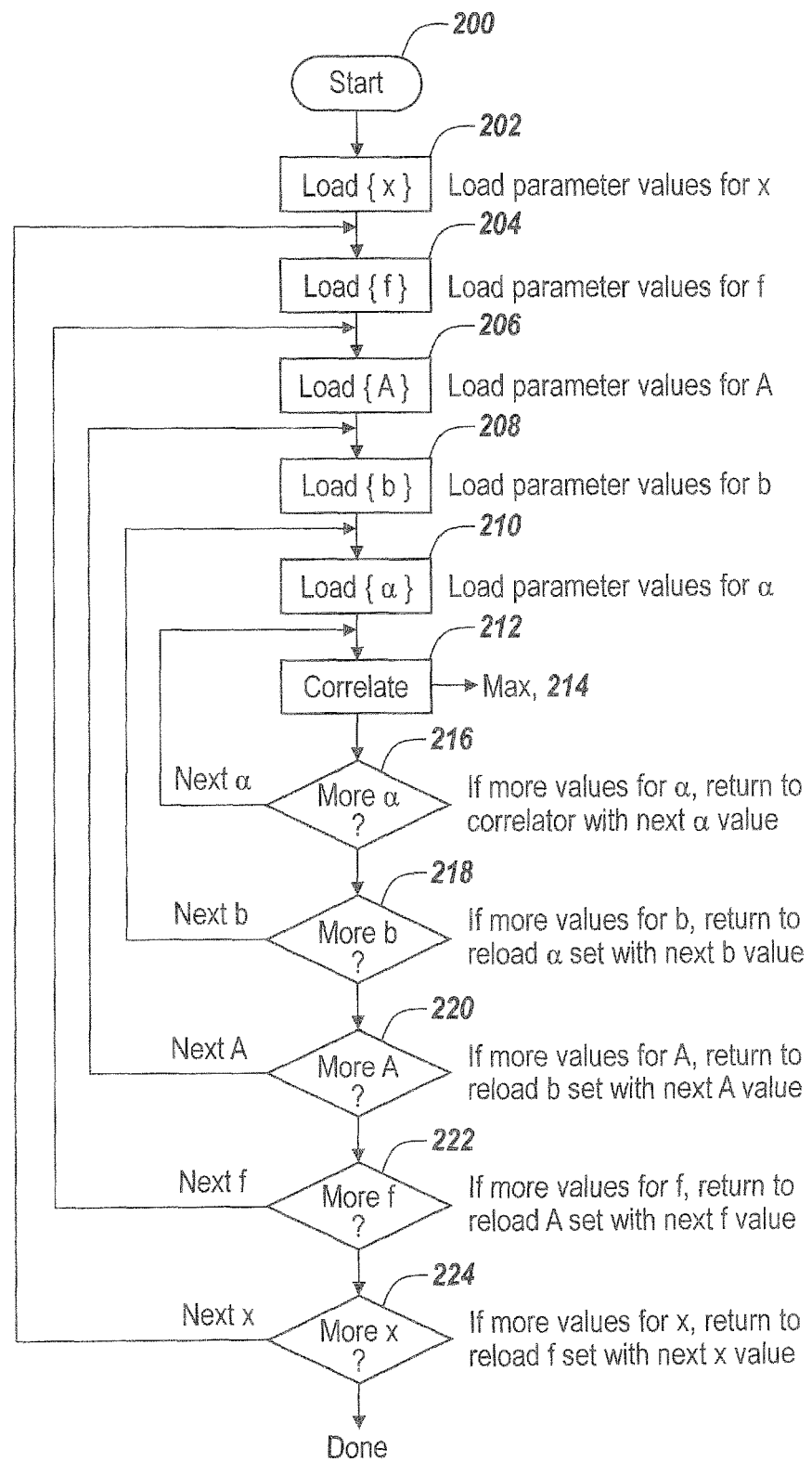
FIG. 8B is a flowchart illustrating how to implement cycling of the different waveforms of FIG. 8A in a processor to be able to simulate the outputs of a large number of wireless devices that could exist on the network, starting with the loading in of the values for modulation types X, followed by the loading in of the parameter values for frequency, followed by the loading in parameter values for amplitude, followed by the loading in of values for code sets, and followed by loading parameter values for the parameter sets so as to assure the cycling through all of the possibilities for the waveforms that the beacon is to produce.

FIG. 8B contains a flowchart illustrating the process. Here starting at 201 the first method step shows the loading of the parameter values for the modulation types {X} as illustrated at 202. Thereafter one loads parameter values for frequency {f} as illustrated at 204 and loads parameter values for the amplitude {A} of the output is illustrated 206, followed by loading in parameter values for code sets {b} as illustrated 208, followed by loading in the parameter values for the parameter sets {a} as illustrated 210. These loaded parameter values are then correlated at 212, with a maximum correlation illustrated at 214.

Note that in the correlation process if there are more values for a as illustrated by decision block 216 one returns to the correlator with the next alpha value. If there are more values for code sets b, as illustrated at decision block 218 one returns to reload the alpha set with the next code b value. As illustrated at decision block 220 if there more values for amplitude, one returns to reload code sets b and parameter set alpha with the next A value. As shown by decision block 222 if there more values for f, one returns to reload sets A, b and alpha. Finally as illustrated by decision block 224 if there more values for x, namely the modulation types, one returns to reload the sets f, A, b and alpha with the next x value.

When all of the above is done, one has run through all the parameters and all of the waveforms used to simulate a particular wireless device so that the beacon has been cycled through all of its wireless device simulations.

As to the beacon used for the beacon sounder, beacon 300 in general includes a CPU 302 which is used to specify the simulation mode for the beacon. In its simplest state, the beacon may be frequency shift keyed as illustrated at 304, phase shift keyed as illustrated at 306, or may be provided with a predetermined modulation type or coding scheme through the use of digital to analog converter 308. Depending upon which modulation scheme is selected by CPU 302, a multiplexer 310 under control of CPU 302 selects which of the modulation type waveforms is to be transmitted. The output of multiplexer 310 is coupled to a variable attenuator 312 to vary the amplitude of the signal transmitted by the beacon, with the output of the attenuator applied to antenna switch 314 which is utilized to switch the output of the beacon to one of the three different types of antennas 316, 318 or 320. It is noted that antenna switch 314 is also under the control of CPU 302. Depending on the range and application one of a number of different antenna configurations can be selected, namely a directional antenna or for instance a small patch antenna as well as for instance a conventional dipole or coil antenna.

Figure 10:
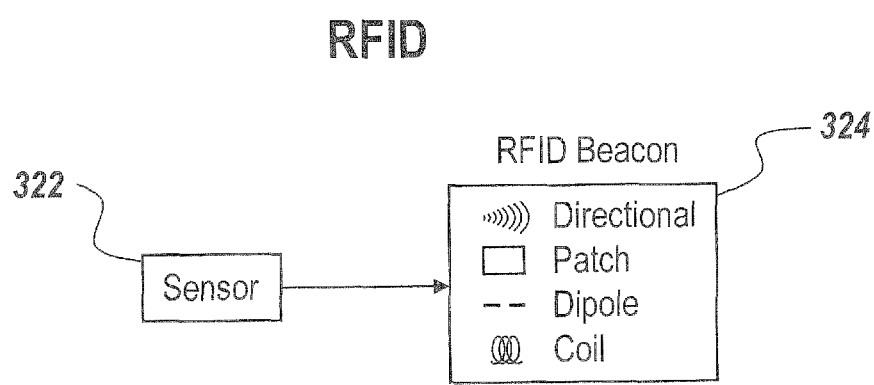
FIG. 10 is a diagrammatic illustration of an example of a beacon in the form of an RFID tag composed of a sensor, and a transmitter coupled to a selectable antenna, such as a directional antenna, a patch antenna, dipole antenna or a coil, indicating that when RFID tag technologies are utilized the beacon can simulate different RFID tag modes and different antennas.

Referring to FIG. 10 taking as an example of an RFID tag, the tag is typically provided with a sensor 322 the output of which is coupled to an RFID beacon 324 which may be provided with one of a number of different antennas depending again on the application.

Figure 9:
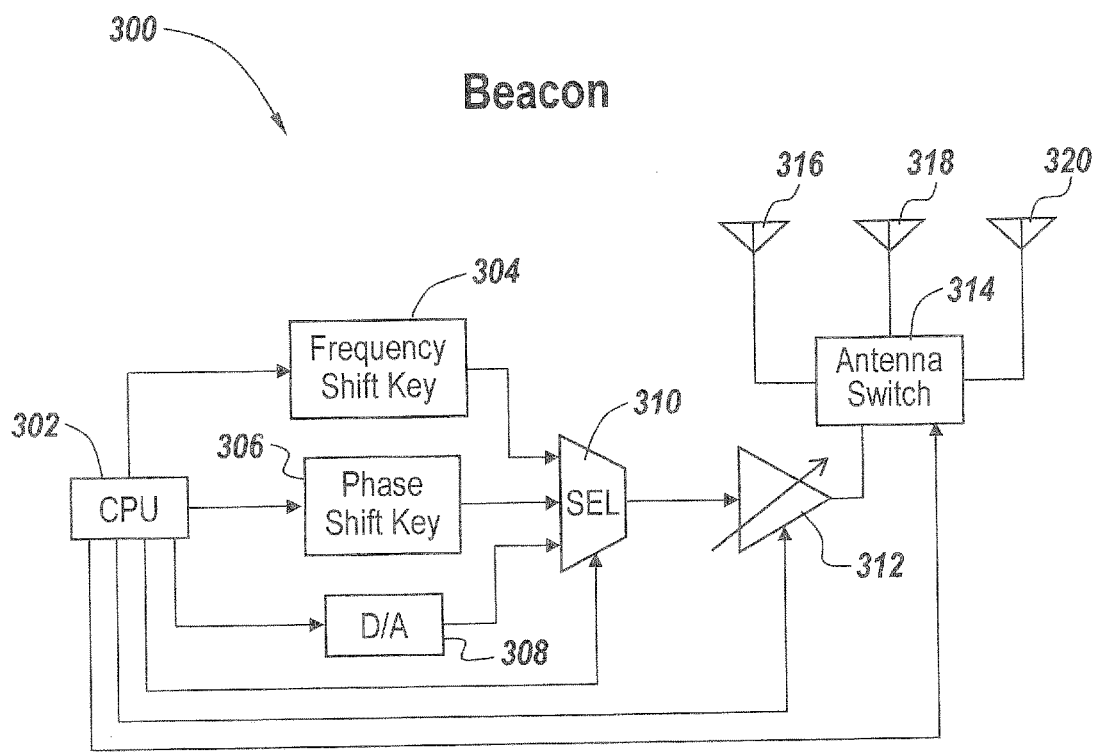
FIG. 9 is a simplified block diagram of a beacon, the output of which is under the control of a CPU which emulates frequency shift keying, phase shift keying and a large number of different parameters generated to the utilization of a digital to analog converter, all of which being multiplexed, with the output being amplitude variable and being transmitted by a selectable one of a number of antennas to provide the beacon with flexibility to simulate the outputs of a number of different wireless devices in a number of different modes.
Figure 11:
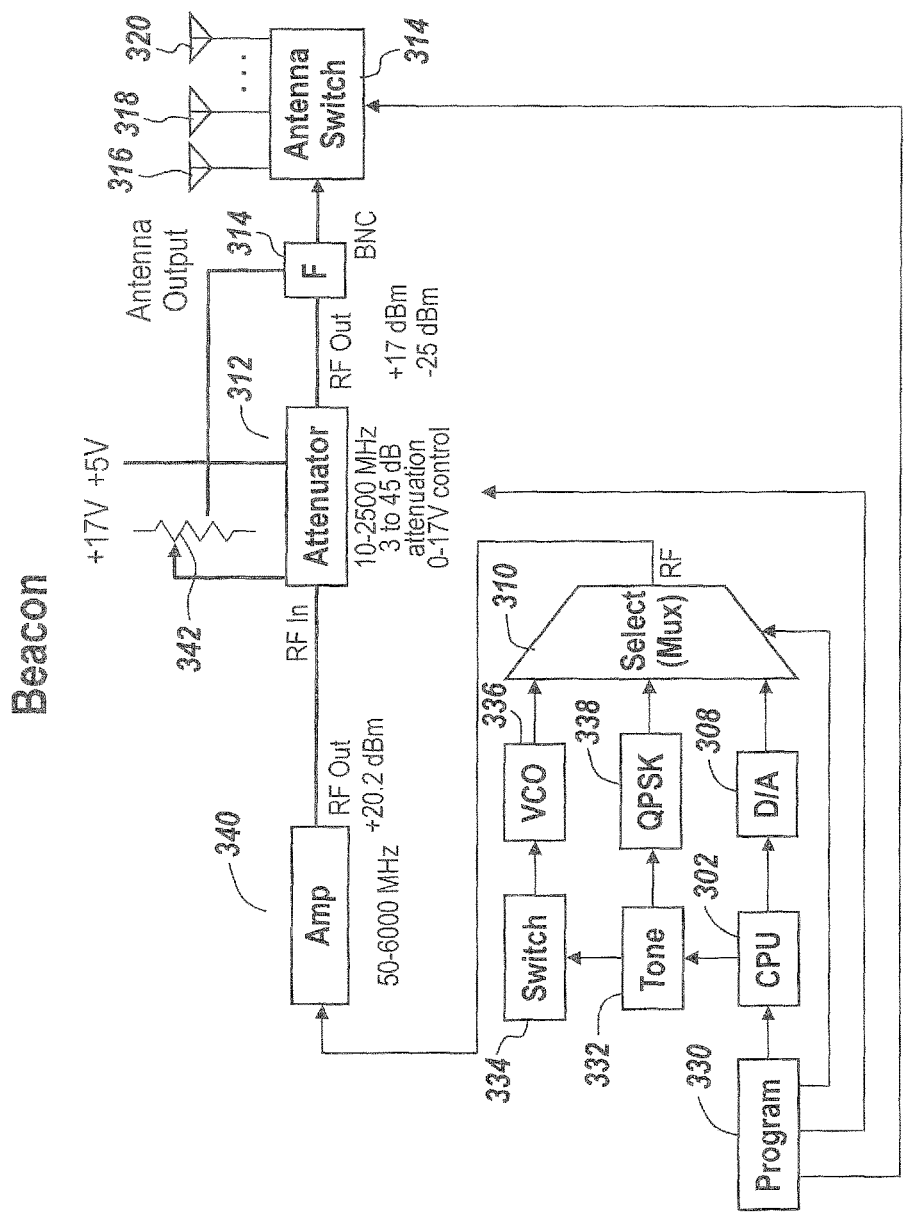
FIG. 11 is a detailed block diagram of the beacon of FIG. 9, illustrating programming for the CPU to provide to provide frequency shift keying in the form of a voltage controlled oscillator and a supply of tones, QPSK generator and analog-to-digital converted signals that are multiplexed, amplified, regulated by an attenuator and coupled to an antenna switch for switching to a selectable antenna.

Referring to FIG. 11 an expanded diagram of the beacon of FIG. 9 is illustrated in which CPU 302 of FIG. 9 is provided with a program 330 which specifies the parameters and modulation types that are to be transmitted by the beacon. In this case program 330 is installed in CPU 302 which in one embodiment generates a tone 332 which is switched at switch 334 to a voltage controlled oscillator 336 that may be utilized to generate frequency shift keyed signals. Tone 332 indicates the digital modulating sequence created from the bits supplied by the CPU where one voltage level indicates a one and the other indicates a zero. It may also be applied to QPSK module 338. As discussed before, any type of modulation scheme can be converted from a digital representation to an analog representation by digital to analog converter 308, with the output of VCO 336, QPSK 338 and analog to digital converter 308 being coupled to a multiplexer 310.

In one embodiment the output of multiplexer 310 is amplified by an amplifier 340 which is a wideband 50-6000 MHz amplifier, the output is which is applied to attenuator 312. Potentiometer 342 controls the attenuation of signals from 3 to 45 dB with a zero −17 V control voltage. The output of attenuator 312 is applied through a BNC connector 344 to antenna switch 314 that selects one of antennas 316, 318 or 320.

Figure 12:
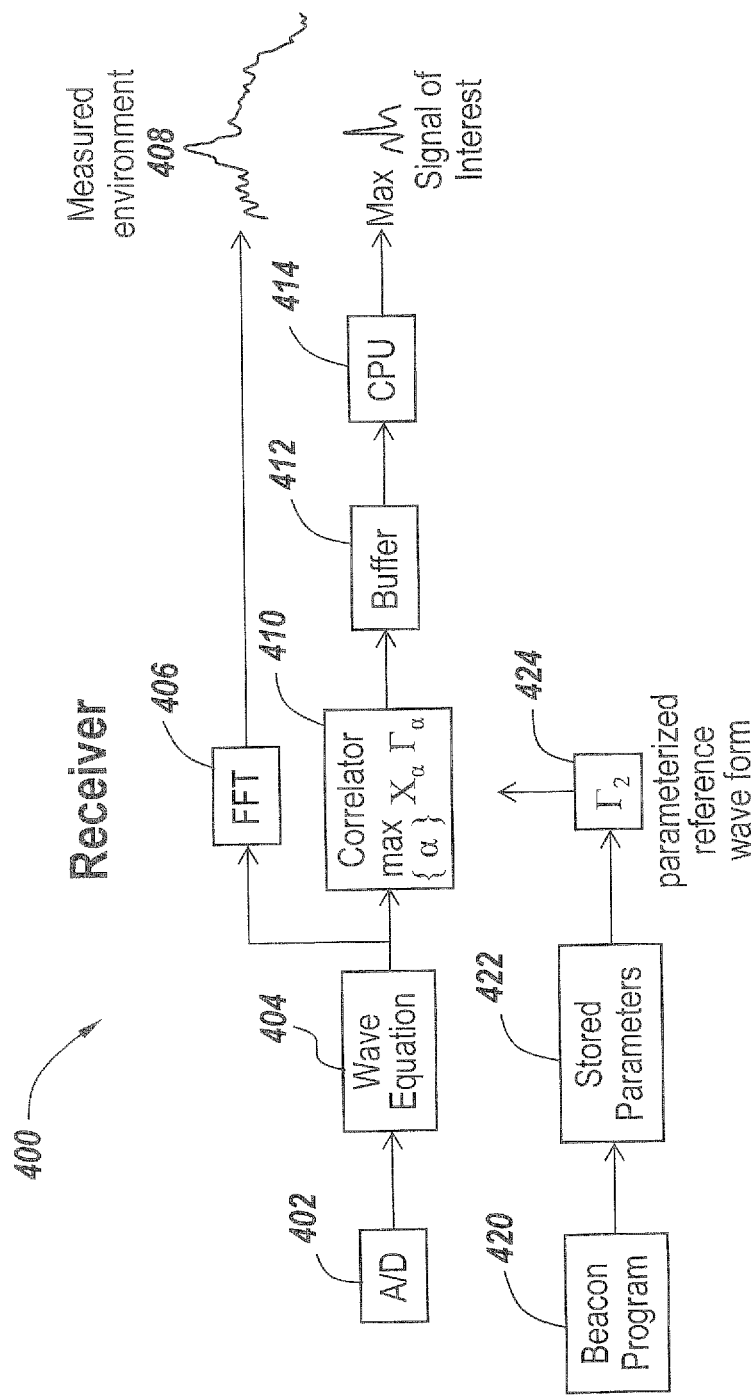
FIG. 12 is a simplified block diagram for a receiver for use in the system of FIG. 4, in which received signals are converted from analog form to digital form and are converted into a sampled wave form after which they are correlated to stored parameters corresponding to those driving the beacon in which the correlation correlates the incoming signal with parameterized reference waveforms to detect relatively weak signals amongst noise, with a fast Fourier transform providing a measured environment for optimization analysis.

As to the receiver utilized in the subject invention, referring to FIG. 12, the correlating receiver 400 is provided with an analog to digital converter 402, the output of which is a digital version of the input signal, ie. wave equation 404. This output is applied to fast Fourier transform 406 to provide a measured environment waveform 408.

The sampled waveform corrected for background by simple subtraction is term the wave equation 404 which is also utilized as an input to correlator 410 that outputs the maximum correlation of the input waveform $X_\alpha$ with $\Gamma\alpha$, the parameterized reference waveform. Thereafter the output is buffered at 412 and is coupled to CPU 414 from which the signal of interest is calculated along with suggested alterations in the parameters of the beacon. It is noted that beacon program 420 accesses stored parameters 422 in order to generate parameterized reference waveform 424 which is used in correlator 410.

Having determined the signal of interest it is a purpose of CPU 414 to take into account the correlation of the measured waveform with the reference waveform as well as the correlation with the background, to suggest what the optimum parameters should be for the beacon.

Figure 13:
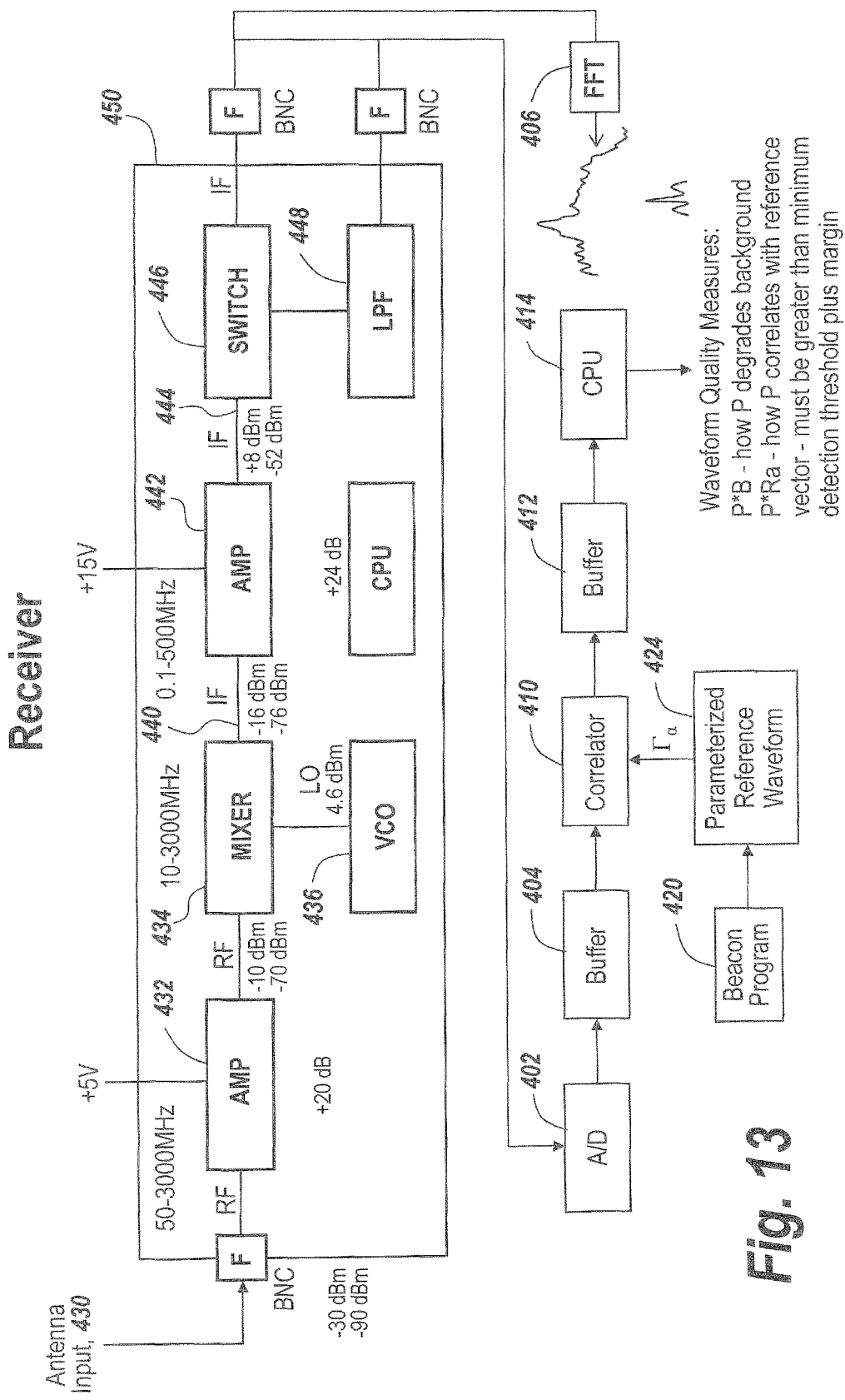
FIG. 13 is expanded block diagram of the receiver FIG. 12 illustrating a wide band receiver that operates on direct down conversion, with the output after correlating being the estimated waveform quality of the estimated waveform.

Referring to FIG. 13 in which like items have like reference characters with respect to FIG. 12, it will be seen that antenna input 430 is coupled to an RF amplifier 432 in turn coupled to a mixer 434 coupled to a local oscillator 436 to provide a direct down converted IF signal 440 applied to an amplifier 442 that supplies an amplified IF signal to a switch 446 which either switches the IF signal 444 out to FFT 406 or to low pass filter 448, with the output of this portion of the receiver 450 coupled to analog to digital converter 402.

As can be seen, the output of the CPU 414 is a correlation of the input to the parameterized reference waveform as well as measure of P dot B to measure orthogonality. It is these three signals which determine the estimated waveform quality measurement and on which suggestions for optimization are made. Note that in FIG. 13 the CPU calculates P as sampled data minus background data previously sampled in terms of blocked frequencies and time slots.

Figure 14:
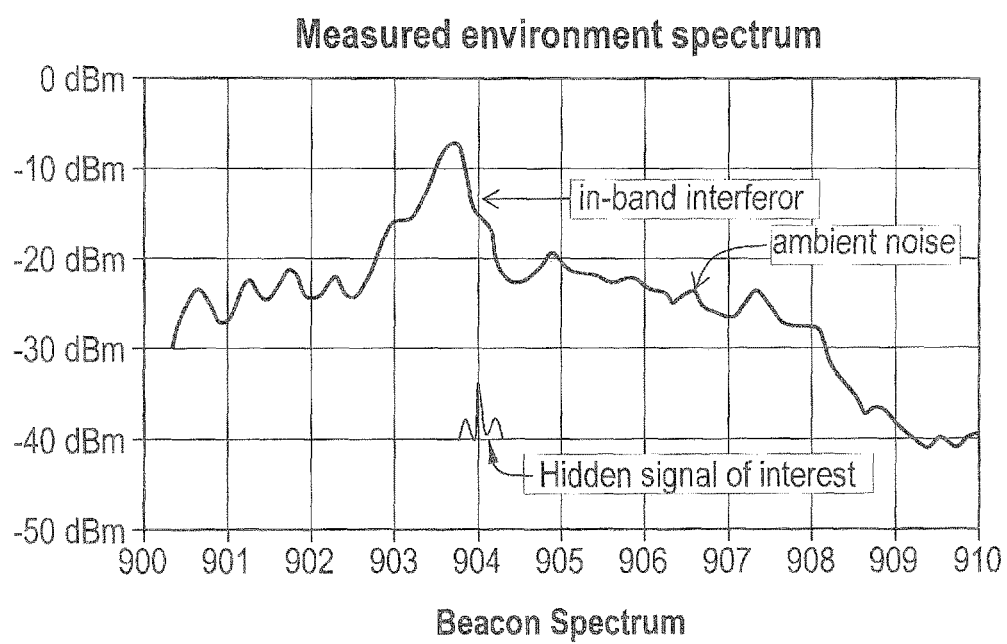
FIG. 14 is a graph of the measured environment spectrum from the receiver FIG. 13, illustrating the wireless environment as detected by the receiver, including for instance in band interferers and ambient noise, also indicating the ability to detect a hidden signal of interest that may be for instance 20 dB down below the ambient noise level.

Referring to FIG. 14, the graph shown is a measured environment spectrum that includes in band interferers and ambient noise. Also shown is a hidden signal of interest well below the noise level which because of the subject correlation is detectable by the subject system where it would otherwise not be recognized. Thus when hunting for beacon signals having low amplitudes the subject system will nonetheless detect signals of interest out of the noise level due to the correlating receiver and be able to provide optimization information based on a heretofore unknown weak signal.

Referring to FIG. 15, it can be seen schematically that the subject system will pick up strong signals of interest as illustrated by the top graph, a signal of interest next to a strong signal as illustrated by the middle graph or weak signals of interest buried in noise. The subject system is thus capable of handling a wide variety of beacon signals from very strong beacon signals to weak ones.

Additionally and as illustrated in FIG. 16 the subject system can provide an eye diagram for incoming signals in which the purity or contaminated nature of the signal may be displayed as illustrated by the diagrams at the bottom of FIG. 16.

Figure 17:
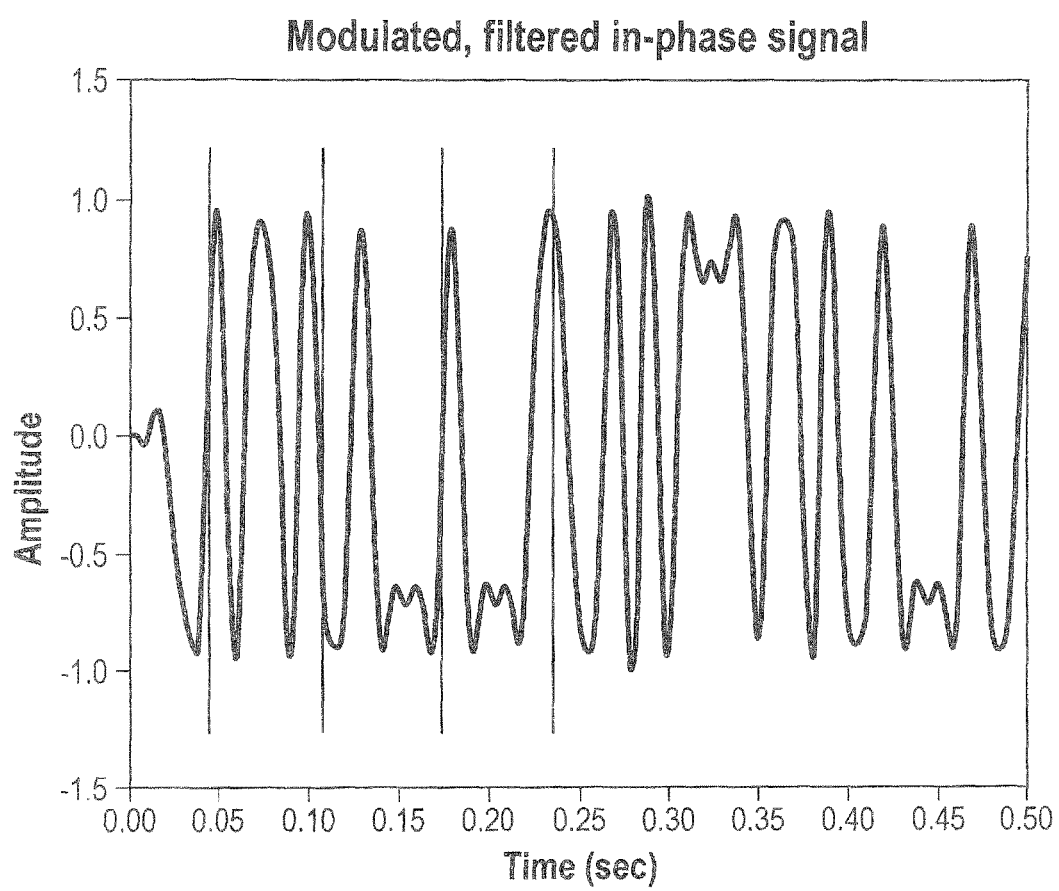
FIG. 17 is the output of the subject receiver indicating the waveform diagram of a demodulated filtered in phase signal showing crisp noise free modulation the result of a robust communication link.
Figure 18:
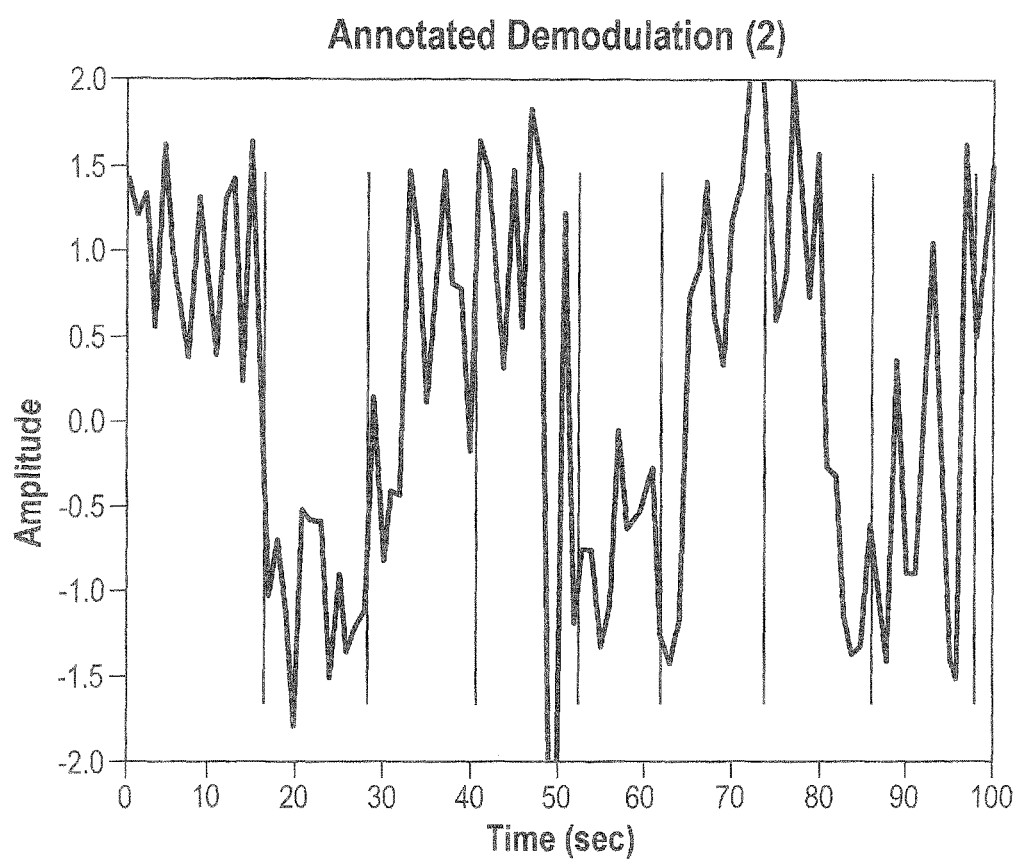
FIG. 18 is a waveform diagram of a demodulated signal corrupted by interfering signals and noise, the result of a poor link quality.

Referring to FIG. 17, the subject system is also capable of displaying the demodulated and filtered in phase signal shown in FIG. 17 showing uncorrupted modulation, as opposed to the demodulated signal shown in FIG. 18 indicating corrupted demodulation which may be due to a number of factors.

Figure 19:
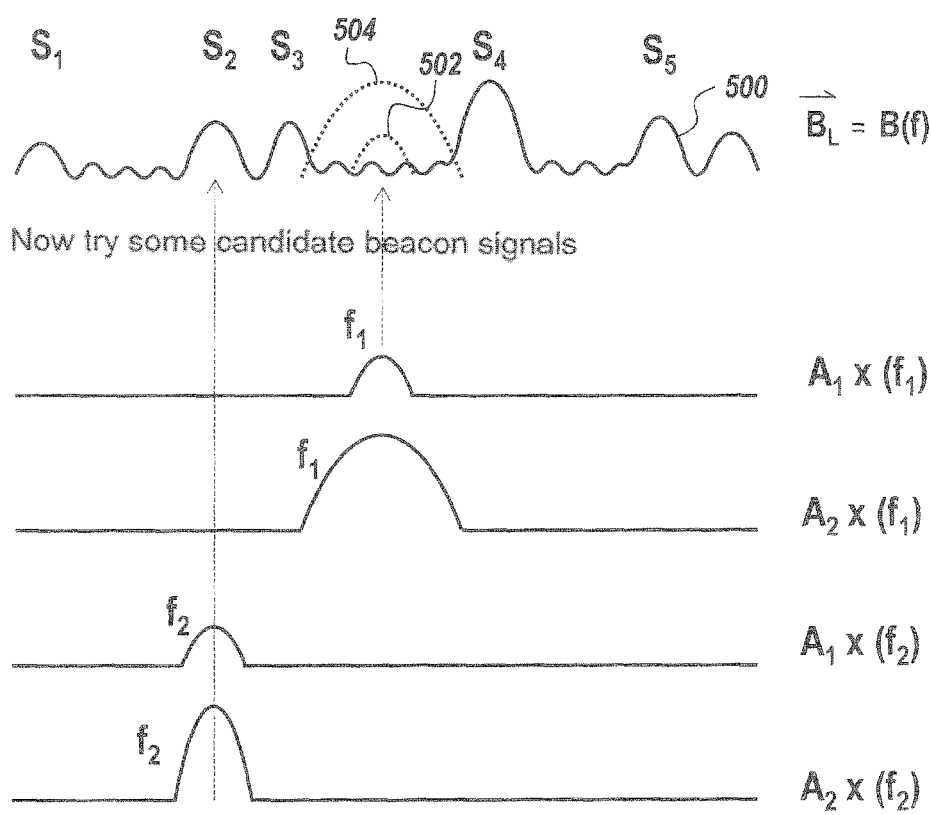
FIG. 19 is a diagrammatic illustration of a wireless environment having a number of signals S1-S5 in which candidate beacon signals are evaluated and the beacon signal having the most robust signal-to-noise ratio and the least interference with other signals is selected as having the best optimization parameters.

Referring to FIG. 19, what is shown is the ability to recommend an incoming beacon signal both in terms of amplitude and in terms of frequency, given a signal environment containing five signals denoted as S1 through S5. Waveform 500 describes the spectrum, a signal environment in which there are signals and background and in which a new sensor X is required not to interfere with existing signals such that X dot S=0.

Noting that waveform 500 is in the frequency domain and now looking at some candidate beacon signals, two candidate signals have the same frequency $f_1$ but different amplitudes $A_1$ and $A_2$. Here it can be seen that the recommended signal has the lower of the amplitudes such that when superimposed over waveform 500, the selected signal has a non-interfering waveform 502. However for the larger of the two amplitudes, waveform 504 slightly overlaps signals S3 and S4 and is therefore not preferred. On the other hand candidate beacon signals having a frequency $f_2$ completely interfere with signal S2 regardless of amplitude are not recommended.

Figure 20:
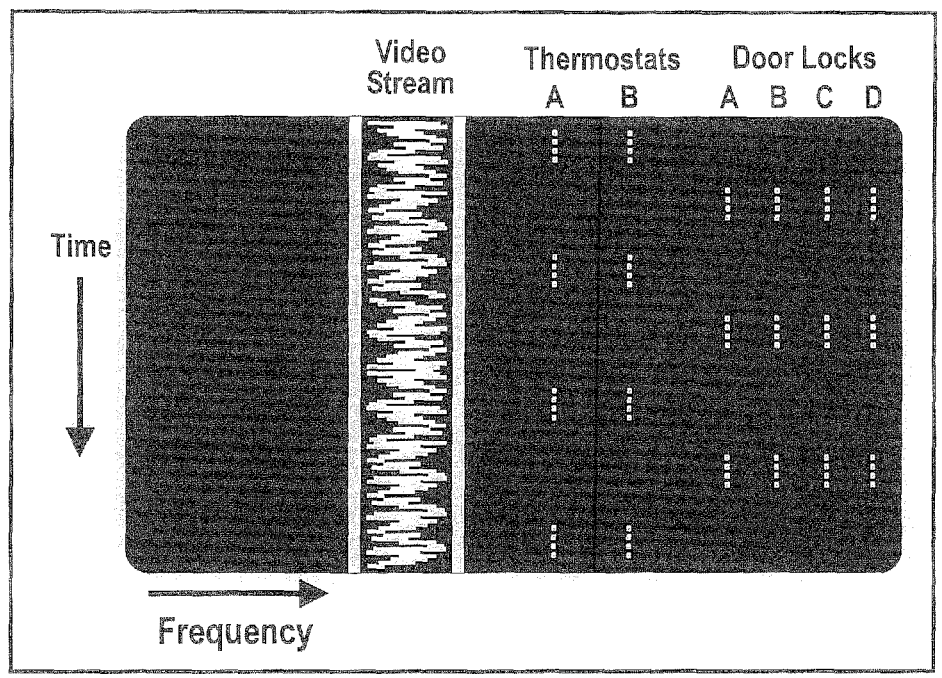
FIG. 20 is a waterfall diagram showing signals for a video camera, a thermostat and keyless door locks showing the time/frequency domain of the signals, also indicating areas for which there is no overlap so as to permit the injection of an additional wireless signal having parameters which avoid the overlap conditions.

Referring now to FIG. 20, what is shown is a waterfall display in which signals from a video camera, a thermostat and keyless wireless door locks are shown. It will be appreciated that the signal from the video camera occupies a particular frequency and is continuously on. On the other hand there are two channels for the thermostats, each operating in a separate frequency channel and each intermittently transmitted in the timeslots illustrated. Finally, signals from the door locks are shown as existing in four channels. For a new wireless device timeslots that are different from the timeslots associated with the thermostat, door locks and video should be utilized to remove any overlap or interference. Also frequencies not utilized are acceptable for the new test signal.

By virtue of the subject system the metrics utilized indicate not only that wireless signals of a predetermined parameterized test have sufficient signal strength to keep the signal to noise ratio sufficiently high, the other metric which measures overlap specifies whether the test signal overlaps with any of the signals shown in the waterfall.

The test signal having a particular parameter set which indicates a minimum power level that provides robust link communications and yet has a minimum overlap or interference number is that set of parameters selected for the new signal to be introduced into the environment. After having run through the some 100,000 test signals, the signal having the parameter set which best satisfies the above criteria is indicated as being that signal which will result in robust communications yet have minimum interference with other signals in the environment.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for automatically probing a wireless environment for obtaining information to optimize wireless networks operating in the wireless environment:

a transmitter located within the wireless environment configured to automatically generate at least two waveforms having different characteristics corresponding to different wireless protocols, wherein the automatic generation is under the control of a stored program of parameters; and a receiver located in said wireless environment configured to establish which of the at least two waveforms provides an optimal link between the transmitter and the receiver and which also interferes least with background signals that include other signals or noise within the wireless environment, wherein said receiver receives signals from said transmitter and correlates said received signals with said stored program of parameters for outputting a number corresponding to a degree of correlation and also for providing a dot product of said received signal with signals derived when no transmitter signal is present, said derived signals corresponding to background signals, said dot product indicating a degree of interference between said transmitter signal and background signals, whereby for each transmitter-generated waveform, an output of said receiver provides an indication of a robustness of the optimal link between said transmitter and said receiver as well as an orthogonality between the received signal and background signals, thereby to permit selection of that transmitter-generated waveform having a correlated value above a predetermined threshold and one exhibiting the least interference between said transmitter signal and background signals.

2. The system of claim 1, wherein said correlation indicates the signal-to-noise ratio associated with the optimal link between said transmitter and said receiver.

3. The system of claim 2, further including thresholding applied to the correlation of each of the signals from said transmitter to establish a detection level of the optimal link between said transmitter and said receiver above a predetermined threshold being the minimum detection level for establishing a robust communications link.

4. The system of claim 3, wherein said detection level include signal-to-noise ratio.

5. The system of claim 1, wherein that transmitter signal which interferes least with the background signals is the transmitter signal having the most orthogonality.

6. The system of claim 1, wherein said transmitter and said receiver correlation are driven by the same stored program of parameters.

7. The system of claim 1, wherein the correlation of the received signal with said transmitter signal permits detection of low-level received signals, whereby low-level signals may be detected in the presence of high noise levels or high level signals not of interest.

8. The system of claim 1, wherein said transmitter is coupled to a processor that establishes said stored program of parameters.

9. The system of claim 8, wherein said parameters include one of frequency, modulation type, power, and data rate, bands or antennas.

10. The system of claim 9, wherein said modulation type includes protocols used by one of Bluetooth, Wi-Fi, LTE, 60 GHz protocol, WiGig; Z wave, Zigbee; IEEE 802.11, AES, WPA, WPAZ, orthogonal frequency division multiplexing, WEP, IMO, channel bonding, Advanced N plus WiMAX, Wireless N plus WiMAX, and ANT.

11. The system of claim 9, wherein modulation type includes one of FSK, swept FM, pa-FSK, BFSK, 4FSK, m-FSK, QPSK or BPSK.

12. The system of claim 1, wherein said transmitter includes a processor for controlling the at least two waveforms generated by said transmitter and further includes one of a frequency shift key module, a phase shift key module or a digital to analog converter coupled to the processor, said modules and analog-to-digital converter coupled to a multiplexer under the control of said processor for outputting a predetermined modulation type.

13. The system of claim 12, further including a variable attenuator coupled to an output of said multiplexer forbearing a power level transmitted by said transmitter.

14. The system of claim 13, further including a multiplicity of antennas coupled to an output of said variable attenuator and an antenna switch for switching amongst said multiplicity of antennas for selection of which antenna is to be used by said transmitter.

15. A system for automatically probing a wireless environment for obtaining information to optimize wireless networks operating in the wireless environment, comprising:

a transmitter located within the wireless environment configured to automatically generate at least two waveforms having different characteristics corresponding to different wireless protocols, wherein the automatic generation is under the control of a stored program of parameters; and a receiver located in said wireless environment configured to establish which of the at least two waveforms provides an optimal link between the transmitter and the receiver and which also interferes least with background signals that include other signals or noise within the wireless environment, wherein the receiver includes:

an analog to digital converter for converting incoming analog signals to digital form;

a fast Fourier transform module for providing a measured environment waveform;

a correlator for correlating the digital form of said incoming analog signal with a parameterized reference waveform derived from the stored program of parameters associated with a programming of said transmitter; and a CPU for determining from an output of said correlator a signal of interest and an orthogonality of said signal of interest with respect to the background signals.

* * * * *